US012675939B2

(12) United States Patent
Fielding et al.

(10) Patent No.: US 12,675,939 B2
(45) Date of Patent: Jul. 7, 2026

(54) GRAPHICS TEXTURE MAPPING

(71) Applicant: Arm Limited, Cambridge (GB)

(72) Inventors: Edvard Fielding, Trondheim (NO);
Jørn Nystad, Trondheim (NO)

(73) Assignee: ARM Limited, Cambridge (GB)

( * ) Notice: Subject to any disclaimer, the term of this
patent is extended or adjusted under 35
U.S.C. 154(b) by 104 days.

(21) Appl. No.: 18/956,255

(22) Filed: Nov. 22, 2024

(65) Prior Publication Data

US 2025/0182376 A1 Jun. 5, 2025

(30) Foreign Application Priority Data

Nov. 30, 2023 (GB) ...................................... 2318300

(51) Int. Cl.
G06T 15/04 (2011.01)
(52) U.S. Cl.
CPC .................................... G06T 15/04 (2013.01)
(58) Field of Classification Search
CPC . G06T 15/04; G06T 1/20; G06T 11/40; G06T
15/005
See application file for complete search history.

(56) References Cited

U.S. PATENT DOCUMENTS 7,369,136 B1 5/2008 Heckbert et al.
7,525,551 B1* 4/2009 Newhall, Jr. ........... G06T 15/04
345/587

7,620,210 B1* 11/2009 Donovan ................ G06T 11/10
345/582
2011/0134136 A1* 6/2011 Seiler ........................ G06T 5/70
345/582
2018/0343436 A1* 11/2018 Salvi .................... H04N 13/106
(Continued)

FOREIGN PATENT DOCUMENTS

WO 2010069269 A1 6/2010

OTHER PUBLICATIONS

Dischler, J.M., "Anisotropic Solid Texture Synthesis Using Orthogonal 2D Views", Dec. 2001, Computer Graphics Forum, vol. 17, pp. 1-10 (Year: 2001).*

(Continued)

*Primary Examiner* — Terrell M Robinson
(74) *Attorney, Agent, or Firm* — Pearl Cohen Zedek
Latzer Baratz LLP

(57) ABSTRACT

When sampling a 3D texture using anisotropic filtering, an anisotropy direction along which to take samples in the texture is determined by determining reduced precision representations of the texture coordinate derivative vectors and using the reduced precision texture coordinate derivative vectors to determine a pair of vectors representing the directions of x and y axes for a 2D coordinate system on the plane in the 3D texture defined by the texture coordinate derivative vectors. The x and y axis vectors are used together with the texture coordinate derivative vectors to determine both a X-axis component and a Y-axis component for projected representations of the texture coordinate derivative vectors in the 2D coordinate system on the plane in the 3D texture defined by the texture coordinate derivative vectors. The projected representations of the texture coordinate derivative vectors are then used to determine the anisotropy direction.

21 Claims, 15 Drawing Sheets

(56) References Cited

U.S. PATENT DOCUMENTS

| | | | |
|---|---|---|---|
| 2023/0377217 A1 | 11/2023 | King | |
| 2025/0005849 A1* | 1/2025 | Riguer | .................... G06T 11/40 |

OTHER PUBLICATIONS

Ament, Marco, "Anisotropic Ambient vol. Shading," "IEEE Transactions on Visualization and Computer Graphics", Jan. 2016, vol. 22, No. 1, pp. 1015-1024 (Year: 2016).*
Romanyuk, A.N., "Ways to Improve Performance of Anisotropic Texture Filtering," " 2017 International Siberian Conference on Control and Communications (SIBCON)", 2017, pp. 1-6 (Year: 2017).*
Combined Search and Examination Report under Sections 17 and 18(3) dated May 31, 2024, GB Patent Application No. 2318300.7, 5 pages.

* cited by examiner

81 — Receive (projected) texture-coordinate derivatives

82 — Compute ellipse-coefficients A and C

83 — Compute ellipse-coefficients B and B^2

84 — Compute ellipse-coefficient F from A, C and B^2

85 — Compute ellipse shape parameters p, q and t

86 — Compute anisotropy degree, LOD, and anisotropy direction vector

87 — LOD/aniso parameters computed, proceed to texture sampling

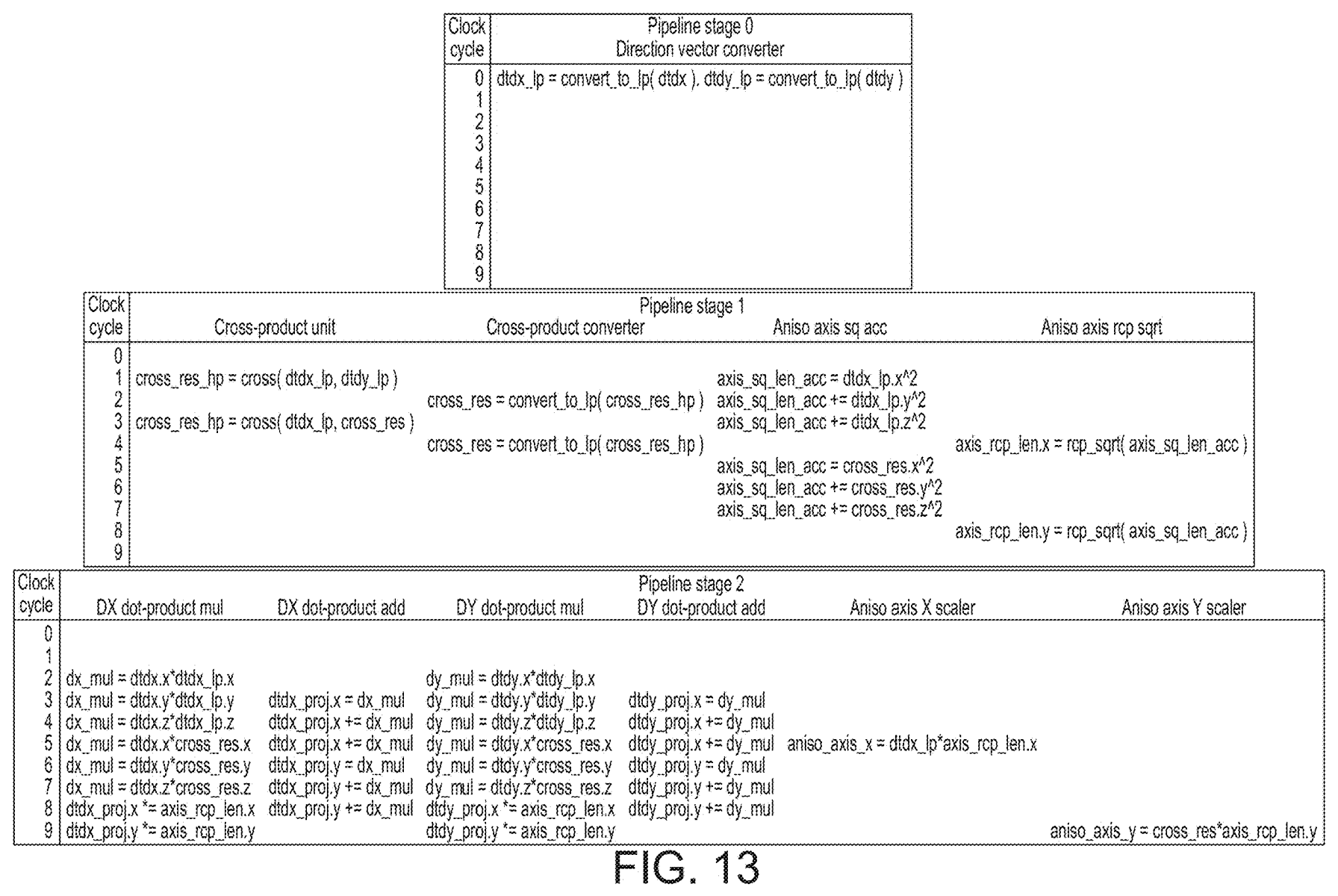

Pipeline stage 0

| Clock cycle | Direction vector converter |
|---|---|
| 0 | dtdx_lp = convert_to_lp( dtdx ), dtdy_lp = convert_to_lp( dtdy ) |
| 1 | |
| 2 | |
| 3 | |
| 4 | |
| 5 | |
| 6 | |
| 7 | |
| 8 | |
| 9 | |

Pipeline stage 1

| Clock cycle | Cross-product unit | Cross-product converter | Aniso axis sq acc | Aniso axis rcp sqrt |
|---|---|---|---|---|
| 0 | | | | |
| 1 | cross_res_hp = cross( dtdx_lp, dtdy_lp ) | | | |
| 2 | | cross_res = convert_to_lp( cross_res_hp ) | axis_sq_len_acc = dtdx_lp.x^2 | |
| 3 | cross_res_hp = cross( dtdx_lp, cross_res ) | | axis_sq_len_acc += dtdx_lp.y^2 | |
| 4 | | cross_res = convert_to_lp( cross_res_hp ) | axis_sq_len_acc += dtdx_lp.z^2 | axis_rcp_len.x = rcp_sqrt( axis_sq_len_acc ) |
| 5 | | | axis_sq_len_acc = cross_res.x^2 | |
| 6 | | | axis_sq_len_acc += cross_res.y^2 | |
| 7 | | | axis_sq_len_acc += cross_res.z^2 | axis_rcp_len.y = rcp_sqrt( axis_sq_len_acc ) |
| 8 | | | | |
| 9 | | | | |

Pipeline stage 2

| Clock cycle | DX dot-product mul | DX dot-product add | DY dot-product mul | DY dot-product add | Aniso axis X scaler | Aniso axis Y scaler |
|---|---|---|---|---|---|---|
| 0 | | | | | | |
| 1 | | | | | | |
| 2 | dx_mul = dtdx.x*dtdx_lp.x | | dy_mul = dtdy.x*dtdy_lp.x | | | |
| 3 | dx_mul = dtdx.y*dtdx_lp.y | | dy_mul = dtdy.y*dtdy_lp.y | | | |
| 4 | dx_mul = dtdx.z*dtdx_lp.z | dtdx_proj.x = dx_mul | dy_mul = dtdy.z*dtdy_lp.z | dtdy_proj.x = dy_mul | aniso_axis_x = dtdx_lp*axis_rcp_len.x | |
| 5 | dx_mul = dtdx.x*cross_res.x | dtdx_proj.x += dx_mul | dy_mul = dtdy.x*cross_res.x | dtdy_proj.x += dy_mul | | |
| 6 | dx_mul = dtdx.y*cross_res.y | dtdx_proj.x += dx_mul | dy_mul = dtdy.y*cross_res.y | dtdy_proj.x += dy_mul | | |
| 7 | dx_mul = dtdx.z*cross_res.z | dtdx_proj.y = dx_mul | dy_mul = dtdy.z*cross_res.z | dtdy_proj.y = dy_mul | | |
| 8 | | dtdx_proj.y += dx_mul | | dtdy_proj.y += dy_mul | | aniso_axis_y = cross_res*axis_rcp_len.y |
| 9 | | dtdx_proj.y += dx_mul | | dtdy_proj.y += dy_mul | | | dtdx_proj.x *= axis_rcp_len.x
dtdx_proj.y *= axis_rcp_len.y

FIG. 13

GRAPHICS TEXTURE MAPPING

BACKGROUND

The technology described herein relates to methods of and apparatus for performing texture mapping in graphics processing systems.

It is common in graphics processing systems to generate colours (and other data) for sampling positions in a render output (e.g. an image to be displayed) by applying so-called textures or texture data to the surfaces to be drawn.

A computer graphics texture will typically be configured as an array of texture data elements (texels), each having a corresponding set of texture data (such as colour, luminance and/or light/shadow, etc., values) stored for it. A sampling position in a render output to which the texture is to be applied will then be mapped to a corresponding position in the texture and the texture sampled at that position using an appropriate filtering process (such as a bilinear filtering process), to determine the texture data to be used for the sampling position in the render output.

An issue that arises with texture mapping in graphics processing is where the surface to which the texture that is being sampled is to be applied is at an oblique viewing angle with respect to the viewpoint (camera), as in that case, the "projection" of the sampling position (pixel) as seen from the viewpoint onto the surface (and thus the texture being sampled) (making the assumption that the sampling point being projected is circular) will not be in the form of a circle (as it would if the surface were perpendicular to the view direction), but will rather be in the form of an ellipse (with the ellipse's dimensions being determined by the angle that the surface has relative to the view direction).

FIG. 1 illustrates this and shows an exemplary render output 1 corresponding to the plane of the screen on which the image being rendered is to be displayed, and comprising a plurality of sampling positions (pixels) 2 (which are assumed to be circular) and for which, e.g., respective texture samples will need to be taken in order to render the pixels appropriately. (FIG. 1 simply shows a small section of the pixels 2 of the render output 1. It will be appreciated that the entire area of render output 1 will comprise an appropriate array of pixels.)

FIG. 1 also shows a "camera" 3, corresponding to the viewpoint with respect to which the render output is being rendered.

As shown in FIG. 1, for an exemplary pixel 4 which will sample a 2D surface 5 that lies at an oblique angle to the view direction from the camera 3, the effective projection of the view "cone" 6 projected from the camera position 3 through the (circular) pixel 4 in the render output (screen) 1 onto the 2D surface 5 that lies at an oblique angle to the view direction will be an ellipse 7.

In such situations, simply taking a "circular" bilinear sample from the texture that is to be applied to the surface will lead to errors, e.g. in terms of the reproduced texture on the surface potentially being blurred and/or there being aliasing.

To address this, a texture sampling technique known as "anisotropic filtering" is used, in which multiple, e.g. bilinear, samples are taken along a line in the texture (typically referred to as the anisotropy direction), which line (anisotropy direction) is intended to correspond to the major axis of the "ellipse" (the elliptical footprint) that corresponds to the projection of the sampling point onto the surface that texture is to be applied to. The multiple samples taken along the line (anisotropy direction) are centred on the texture coordinate to be sampled (which will be the centre of the ellipse).

FIG. 2 illustrates this and shows the taking of plural (in this case six) texture samples 20 along an anisotropy direction 21 corresponding to the major axis of an "ellipse" 22 corresponding to the projection of the sampling position onto the surface (as discussed above) in a texture 23. The samples from the texture are then appropriately combined to give the final output sampled texture value.

When performing anisotropic filtering, it is usually necessary to determine the level of detail (LOD) at which to sample the texture (this is used, inter alia, to determine the mipmap level(s) at which to sample the texture), the anisotropy direction (the line) along which the samples are to be taken in the texture, and the number of samples to take along the anisotropy direction (the "anisotropy degree").

These parameters are normally determined by finding the ellipse which approximates the shape of the sampling position when projected onto the surface to which the texture is to be applied. The minor axis of the projected ellipse is then used to find the level of detail at which to sample the texture, the (direction of) the major axis of the ellipse indicates the direction of the line within the texture along which to sample the texture (the anisotropy direction), and the ratio of the major axis to the minor axis of the projected ellipse is used to determine (as) the number of samples to be taken along the line (the anisotropy direction) in the texture (the anisotropy degree).

When sampling a 2D texture (surface), the projected elliptical footprint of the sampling position (normally in terms of its ellipse coefficients A, B and C) on the surface is usually determined from the derivatives of the texture coordinates in the X and Y direction of the (screen) space in which the render output is being generated. Thus, an "X" texture coordinate derivative, dTdx, and a "Y" texture coordinate derivative dTdy are determined, and then used to determine the ellipse coefficients A, B and C.

These derivatives are expressed in terms of the texture coordinate space, such that they indicate the difference in terms of the texture coordinates (the number of texels) between the texture coordinates for one sampling position in the screen space (the sampling position that is currently being sampled) and the texture coordinates for the next sampling position in the screen space in the X and Y directions respectively.

The texture coordinate derivatives in the X and Y directions of the render output space may be determined, e.g., by grouping the sampling positions into 2×2 sampling position "quads". The X derivative is then determined as the coordinate difference between the texture coordinates of the top two positions in the 2×2 quad, and the Y-derivative is determined as the coordinate difference between the texture coordinates of the two left-hand positions in the 2×2 quad.

FIG. 3 illustrates this, and shows the X derivative 30 and the Y derivative 31 for a 2×2 sampling position quad 32.

The so-determined texture coordinate derivatives are then used to determine the coefficients A, B and C for the implicit function $Ax^2+Bxy+Cy^2=F$ defining the elliptical footprint of the sampling position on the 2D surface to which the texture is to be applied.

It is known to use three-dimensional (3D) textures (e.g. volume textures) in graphics processing. In this case, the elliptical footprint that corresponds to the projection of the (circular) sampling position on to the surface that the texture is to be applied to will effectively be an ellipse on a plane passing through the 3D-texture.

In this case it is accordingly necessary to determine the anisotropy direction (the line) intended to correspond to the major axis of the "ellipse" that corresponds to the projection of the (circular) sampling point on that (arbitrary) plane through the 3D texture. Correspondingly, the multiple samples should then be taken along that line (anisotropy direction) on that plane through the 3D texture.

In the case of sampling a 3D texture using anisotropic filtering, again the texture coordinate derivatives, but in this case in the 3D coordinate system of the 3D texture, are determined and used when the determining anisotropic filtering parameters (the anisotropy direction, the anisotropy degree and the level of detail).

In this case, the X-derivative (vector) is determined as the difference between the texture coordinates in the coordinate system of the 3D texture for the sampling position being considered and the immediately adjacent sampling position in the X direction in the render output, and correspondingly, the Y-derivative (vector) is determined as the difference between the texture coordinates in the coordinate system of the 3D texture for the sampling position being considered and the texture coordinates of the next (immediately adjacent) sampling position in the Y direction in the render output.

The Applicants believe that there remains scope for improved techniques for performing anisotropic filtering when performing graphics texture mapping, in particular when performing anisotropic filtering of 3D textures.

BRIEF DESCRIPTION OF THE DRAWINGS

Embodiments of the technology described herein will now be described by way of example only and with reference to the accompanying drawings, in which:

FIG. 13 is a pipeline timing diagram for the pipeline of FIG. 12.

Like numerals are used for like features in the drawings where appropriate.

DETAILED DESCRIPTION

Figure 1:
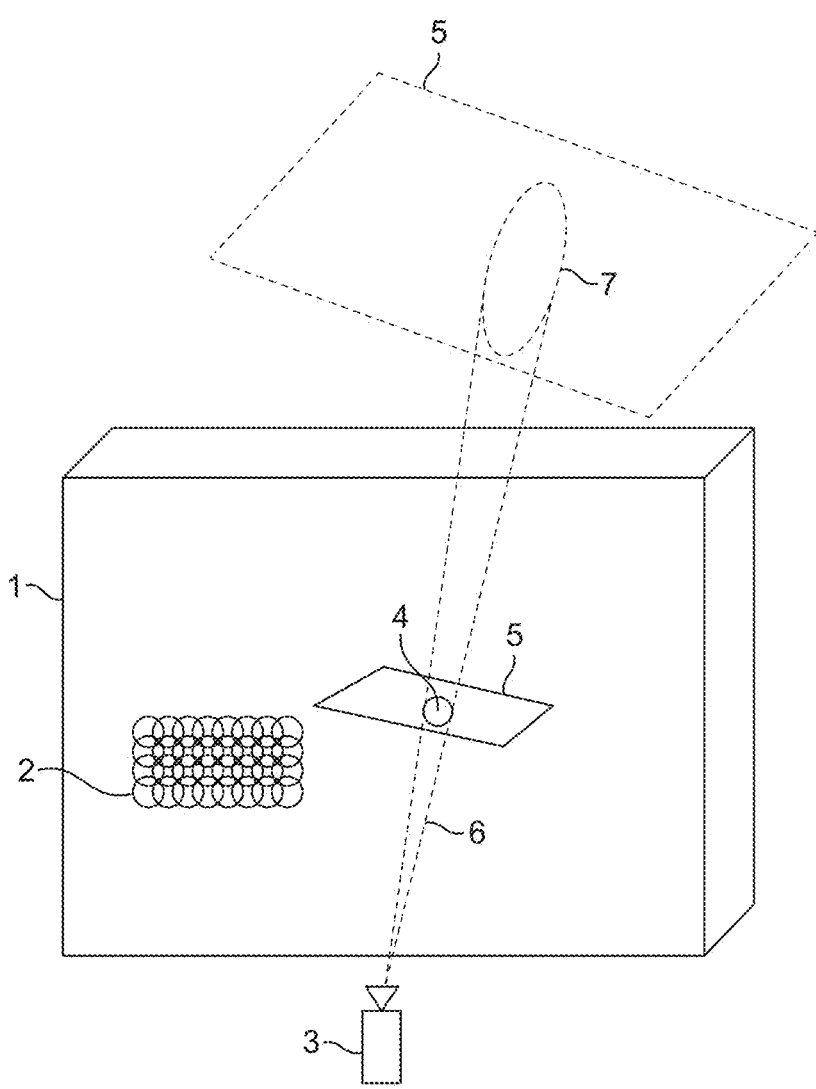
FIG. 1 shows the principles of anisotropic filtering when sampling a texture.

A first embodiment of the technology described herein comprises a method of performing anisotropic filtering when sampling a 3D texture to provide an output sampled texture value for use when rendering an output in a graphics processing system, the method comprising:

when sampling a 3D texture using anisotropic filtering to provide an output sampled texture value for a position X, Y in a render output:

determining an anisotropy direction along which to take samples in the texture by:

determining a pair of texture coordinate derivative vectors, dTdx, dTdy, in the coordinate system of the 3D texture for the position in the render output for which the texture is to be sampled;

determining a reduced precision representation dTdx', dTdy' of each determined texture coordinate derivative vector dTdx, dTdy;

using the reduced precision representations dTdx', dTdy' of the texture coordinate derivative vectors to determine a pair of vectors, aniso_axis_x, aniso_axis_y, representing the directions of x and y axes, respectively, for a 2D coordinate system on the plane in the 3D texture defined by the texture coordinate derivative vectors dTdx, dTdy;

using the determined x and y axis vectors, aniso_axis_x, aniso_axis_y, for the 2D coordinate system on the plane in the 3D texture defined by the texture coordinate derivative vectors dTdx, dTdy, together with representations of the texture coordinate derivative vectors, to determine projected representations dTdx_proj, dTdy_proj, of the texture coordinate derivative vectors dTdx, dTdy, in the 2D coordinate system on the plane in the 3D texture defined by the texture coordinate derivative vectors dTdx, dTdy, wherein:

the determining the projected representations dTdx_proj, dTdy_proj, of the texture coordinate derivative vectors dTdx, dTdy, in the 2D coordinate system on the plane in the 3D texture defined by the texture coordinate derivative vectors dTdx, dTdy comprises determining both an X-axis component and a Y-axis component in the 2D coordinate system on the plane in the 3D texture for each projected representation, dTdx_proj, dTdy_proj, of the texture coordinate derivative vectors;

the method further comprising:

using the determined projected representations, dTdx_proj, dTdy_proj, of the 3D texture coordinate derivative vectors dTdx, dTdy, in the 2D coordinate system on the plane to determine an anisotropy direction along which to take samples in the texture;

transforming the so-determined anisotropy direction back to the coordinate system of the 3D texture to thereby determine an anisotropy direction in the 3D texture along which to take samples in the texture;

taking one or more samples along the determined anisotropy direction in the 3D texture; and using the sample or samples taken along the anisotropy direction in the 3D texture to provide an output sampled texture value for use for the position in the render output for which the texture is being sampled.

A second embodiment of the technology described herein comprises an apparatus for performing anisotropic filtering when sampling a 3D texture to provide an output sampled texture value for use when rendering an output in a graphics processing system, the apparatus comprising:

an anisotropy direction determining circuit configured to, when sampling a 3D texture using anisotropic filtering to provide an output sampled texture value for a position X, Y in a render output, determine an anisotropy direction along which to take samples in a texture by:

determining a pair of texture coordinate derivative vectors, dTdx, dTdy, in the coordinate system of the 3D texture for the position in the render output for which the texture is to be sampled;

determining a reduced precision representation dTdx', dTdy' of each determined texture coordinate derivative vector dTdx, dTdy;

using the reduced precision representations dTdx', dTdy' of the texture coordinate derivative vectors to determine a pair of vectors, aniso_axis_x, aniso_axis_y, representing the directions of x and y axes, respectively, for a 2D coordinate system on the plane in the 3D texture defined by the texture coordinate derivative vectors dTdx, dTdy;

using the determined x and y axis vectors, aniso_axis_x, aniso_axis_y, for the 2D coordinate system on the plane in the 3D texture defined by the texture coordinate derivative vectors dTdx, dTdy, together with representations of the texture coordinate derivative vectors, to determine projected representations dTdx_proj, dTdy_proj, of the texture coordinate derivative vectors dTdx, dTdy, in the 2D coordinate system on the plane in the 3D texture defined by the texture coordinate derivative vectors dTdx, dTdy, wherein:

the determining the projected representation dTdx_proj, dTdy_proj, of the texture coordinate derivative vectors dTdx, dTdy, in the 2D coordinate system on the plane in the 3D texture defined by the texture coordinate derivative vectors dTdx, dTdy comprises determining both an X-axis component and a Y-axis component in the 2D coordinate system on the plane in the 3D texture for each projected representation, dTdx_proj, dTdy_proj, of the texture coordinate derivative vectors;

using the determined projected representations, dTdx_proj, dTdy_proj, of the 3D texture coordinate derivative vectors dTdx, dTdy, in the 2D coordinate system on the plane to determine an anisotropy direction along which to take samples in the texture; and transforming the so-determined anisotropy direction back to the coordinate system of the 3D texture to thereby determine an anisotropy direction in the 3D texture along which to take samples in the texture;

the apparatus further comprising:

a texture sampling circuit configured to take one or more samples along a determined anisotropy direction in a 3D texture; and a sample combining circuit configured to use a sample or samples taken along an anisotropy direction in a 3D texture to provide an output sampled texture value for use for a position in a render output for which the texture is being sampled.

The technology described herein relates to the anisotropic filtering of 3D textures. In the technology described herein, when determining the anisotropy direction to use when sampling a 3D texture, the appropriate texture coordinate derivative vectors in the coordinate system of the 3D texture are determined, to thereby define a 2D plane in the 3D texture that the anisotropy direction will lie in.

The 3D texture coordinate derivative vectors are then projected to a 2D coordinate system on that plane, with the so-projected derivative vectors then being used to determine the anisotropy direction. The so-determined anisotropy direction is then transformed back to the (3D) coordinate system of the 3D texture for the samples in the 3D texture to then be taken based on and using that anisotropy direction.

Thus, in the technology described herein, in order to facilitate the determination of the anisotropy direction (and other required anisotropic filtering parameters) when sampling a 3D texture using anisotropic filtering, the derivative vectors of the texture coordinates in the three-dimensional coordinate system of the 3D texture are projected to a 2D coordinate system on the plane through the 3D texture defined by the 3D texture coordinate derivative vectors, with those projected derivative vectors in the 2D coordinate system of the plane then being used to determine the anisotropy direction (and other anisotropic filtering parameters) in the 2D coordinate system on the plane. This then allows the anisotropic filtering parameter determination processes (and, e.g., hardware) that are used for determining the anisotropic filtering parameters when sampling a 2D texture using anisotropic filtering, to also be used to determine the relevant anisotropic filtering parameters when sampling a 3D texture using anisotropic filtering.

Figure 4:
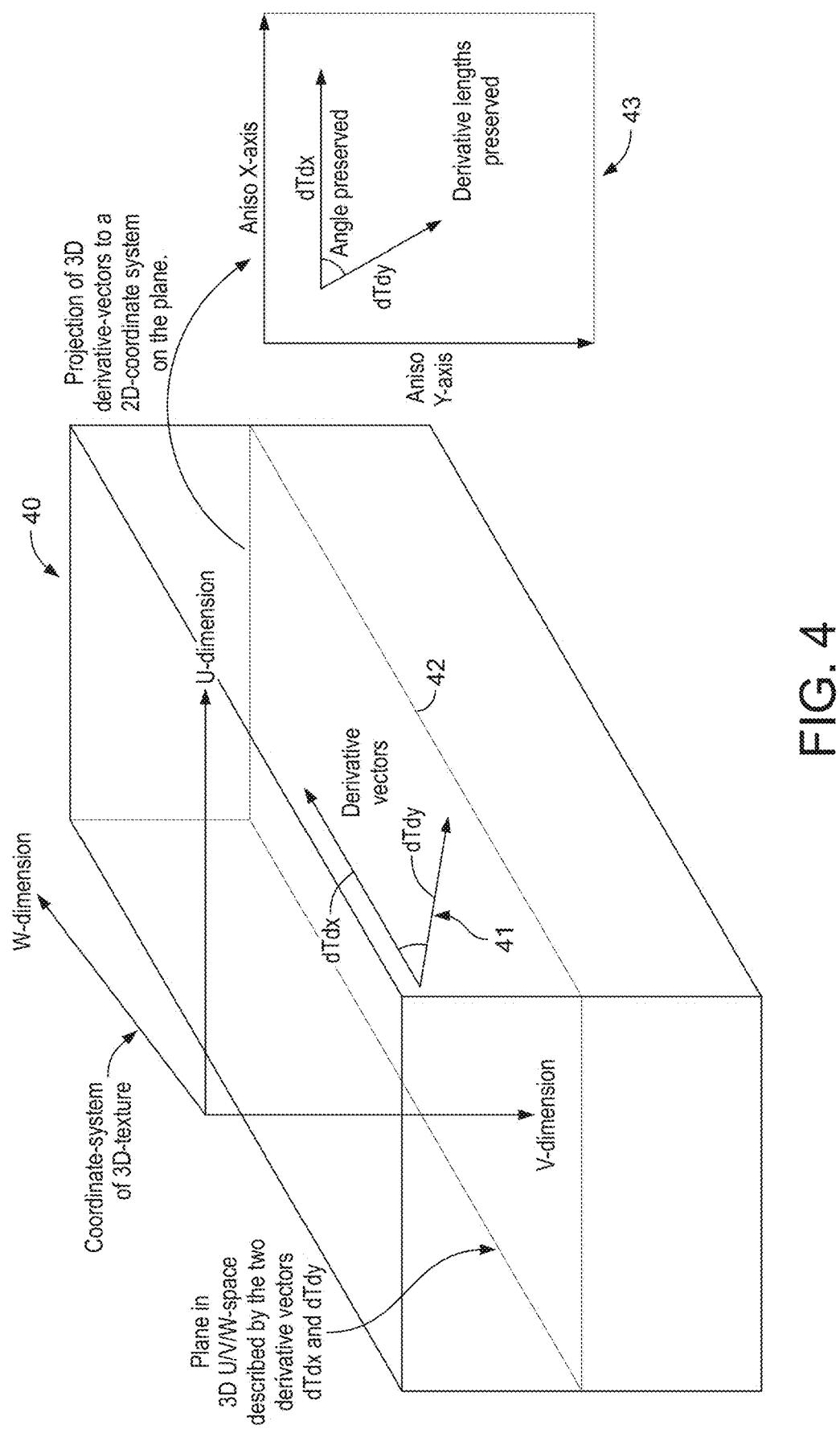
FIG. 4 shows schematically embodiments of anisotropically sampling a 3D texture.

FIG. 4 illustrates this, and shows an exemplary 3D texture 40 having a (3D) coordinate system (U, V, W), together with a set of texture coordinate derivative vectors dTdx, dTdy 41 that together effectively define a plane 42 in the 3D U, V, W space of the volume texture (which corresponds to the surface within the 3D volume texture 40 that the sampling position being considered "projects" on to).

As shown in FIG. 4, the 3D texture coordinate derivative vectors dTdx, dTdy are then projected to a 2D coordinate system 43 on the plane through the 3D texture.

The projected texture coordinate derivative vectors in the 2D coordinate system 43 on the plane through the 3D texture are then used to determine the anisotropic filtering parameters, including at least the anisotropy direction, to be used for sampling the 3D texture.

The anisotropy direction that is determined using the 3D texture coordinate derivative vectors projected to the 2D coordinate system on the plane is then transformed (projected) back to the 3D coordinate system of the 3D texture to then provide the anisotropy direction in the 3D texture along which the samples in the 3D texture should be taken.

In the technology described herein, in order to project the 3D texture coordinate derivative vectors to a 2D coordinate system on a plane defined by those vectors, vectors representing respective x and y axes, aniso_axis_x, aniso_axis_y, in the 2D coordinate system of the plane defined by the 3D texture coordinate derivative vectors are determined, and then those determined x and y axes in the 2D coordinate system on the plane defined by the texture coordinate derivative vectors are used when determining the projected texture coordinate derivative vectors in the 2D coordinate system on the plane (which projected texture coordinate derivative vectors are then used to determine the anisotropy direction along which to take samples in the texture).

Furthermore, in the technology described herein, the respective x and y axes for the 2D coordinate system on the plane in the 3D texture defined by the texture coordinate derivative vectors are determined using reduced precision representations of the texture coordinate derivative vectors. For example, and in an embodiment, the texture coordinate derivative vectors may be initially provided in a higher precision format, such as FP32 format. In the technology described herein, the texture coordinate derivative vectors are then converted to a lower precision format, such as an integer format, for use when determining the respective x and y axes for the 2D coordinate system on the plane defined by the texture coordinate derivative vectors.

The Applicants have recognised in this regard that at least embodiments of the projection of the texture coordinate derivative vectors to a 2D coordinate system on the plane in the 3D texture defined by those vectors do not need to be performed at the initial (high) precision of the (3D) texture coordinates to be sampled, but can be performed at a lower precision, without any significant impact on the overall sampled texture value output being generated (as compared to if performing those operations entirely using the original, higher precision format of the texture coordinates). Moreover, by performing these operations using a lower precision format, they can be performed (e.g. in hardware) in a (much) less costly manner (e.g. in terms of hardware area and/or energy costs), than if the original, higher precision format was being used.

Furthermore, in the technology described herein, when then determining the projected texture coordinate derivative vectors in the 2D coordinate system on the plane defined by the (3D) texture coordinate derivative vectors using the determined x and y axes for that 2D coordinate system, for each projected texture coordinate derivative vector, both an X component and a Y component in the 2D coordinate system on the plane defined by the texture coordinate derivative vectors are determined.

The Applicants have recognised in this regard that when using a lower precision to determine the axes of the 2D coordinate system in the 2D plane, potential errors introduced by using lower precision for that operation can be accounted for and compensated for (at least in part) by determining both X and Y components in the 2D coordinate system on the plane for the respective projected texture coordinate derivative vectors in that plane (rather than simply, e.g., assuming that one of the projected texture coordinate derivative vectors will be parallel to one of the coordinate axes in the plane).

This all then facilitates performing the projection of the 3D texture coordinate derivative vectors to the 2D coordinate system on the plane (to thereby allow the anisotropy direction (and, in an embodiment, the other anisotropic filtering parameters) to be determined in a "2D" manner) in a less expensive way, but while still producing the anisotropic filtering parameters in a way that provides a suitable and satisfactory output, and without the need to perform the entire process using the higher precision format that the texture coordinates are initially provided in.

The texture that is being sampled in the technology described herein can be any suitable and desired 3D texture that can be used in and for graphics processing, and can represent and store any suitable and desired data that textures may be used to represent in graphics processing and graphics processing systems. Thus the texture may represent, for example, appropriate colour values (e.g. RGBα values) (and in one embodiment that is the case), but could also represent other graphics processing parameters and data that may be represented using textures, such as luminance values, light/shadow values, depth values, etc., The technology described herein is applicable irrespective of the actual data that the texture being sampled represents.

Correspondingly the texture being sampled should, and in an embodiment does, comprise an appropriate (3D) array of texture data elements (texels), each having an associated data (e.g. colour) value. The texture value that it is desired to sample will, correspondingly, in an embodiment be indicated by indicating an appropriate position or positions within the texture (texture coordinates) at which the texture is to be sampled to provide the output sampled texture value that is required for the graphics processing texturing operation in question.

The texture being sampled is in an embodiment provided as a plurality of mipmaps (mipmap levels), with each mipmap level being progressively less detailed than the previous level. The set of mipmaps for the texture may comprise only two mipmap levels, but in an embodiment comprises more than two mipmap levels, for example extending from a most detailed mipmap level through progressively less detailed mipmap levels down to a least detailed mipmap level, for example comprising a single texel. In general, the mipmap levels for the texture can be arranged and configured as desired, e.g., and in an embodiment, in accordance with the way that textures are organised and configured as mipmap levels for the graphics processor and graphics processing system, and/or application that requires the graphics processing, in question.

The technology described herein relates in particular to the determination of an anisotropy direction along which to take samples in a 3D texture when sampling a 3D texture using anisotropic filtering.

In order to do this, a pair of texture coordinate derivative vectors, dTdx, dTdy, in the coordinate system of the 3D texture for the position in the render output for which the texture is to be sampled are determined. Those "3D" texture coordinate derivative vectors are then projected to a 2D coordinate system on the plane in the 3D texture defined by the 3D texture coordinate derivative vectors, with the so-projected "2D" versions of the texture coordinate derivative vectors then being used to determine an anisotropy direction along which to take samples in the texture.

The pair of texture coordinate derivative vectors, dTdx, dTdy in the coordinate system of the 3D texture for the position in the render output for which the texture is to be sampled can be determined in any suitable and desired manner.

They should be, and are in an embodiment, respectively determined as the difference between the texture coordinates in the coordinate system of the 3D texture for the render output sampling position being considered and for the next (immediately adjacent) sampling position in the X direction of the render output, and as the difference between the texture coordinates in the coordinate system of the 3D texture for the sampling position being considered and for the next (immediately adjacent) sampling position in the Y direction of the render output. Thus, in an embodiment:

$$dTdx(x, y) =$$
$$(u(x+1, y) - u(x, y), v(x+1, y) - v(x, y), w(x+1, y) - w(x, y))$$
$$dTdy(x, y) =$$
$$(u(x, y+1) - u(x, y), v(x, y+1) - v(x, y), w(x, y+1) - w(x, y))$$

where
x, y is the position in the render output for which the texture is being sampled, and u, v, w are the coordinates in the 3D texture that are being sampled for the respective sampling positions in the render output.

The 3D texture coordinate derivative vectors can be determined using any suitable and desired process. For example, respective 2×2 "quads" of sampling positions may be processed using respective execution threads executing appropriate shader program instructions to thereby generate the 3D texture coordinate derivative vectors.

The (initial) 3D texture coordinate derivative vectors dTdx, dTdy, should be, and are in an embodiment, determined at a first (higher) precision, such as, and in an embodiment, at the precision that the texture coordinates to be sampled for the sampling positions in the render output are provided in. This will typically be in a higher precision number format, such as a floating point format, such as (and in an embodiment) FP32 format.

In the technology described herein, reduced precision representations, dTdx', dTdy' of each determined texture coordinate derivative vector in the 3D coordinate system of the 3D texture are then determined. Any suitable and desired reduced precision representation of the 3D texture coordinate derivative vectors can be determined and used in this regard.

In an embodiment the reduced precision representations of the texture coordinate derivative vectors use fewer bits than the initial representations of those vectors. In an embodiment the reduced precision representation comprises a signed number format, using N bits.

In an embodiment, a (reduced precision) integer representation of the 3D texture coordinate derivative vectors is determined and used. In an embodiment, the reduced precision representation of the texture coordinate derivative vectors comprises a, in an embodiment signed, integer vector with N-bit precision.

Thus in an embodiment, the 3D texture coordinate derivative vectors are converted from an initial floating point representation to an integer representation to thereby generate reduced precision representations of the texture coordinate derivative vectors.

In an embodiment, the reduced precision representation has a precision of 8 to 10 bits, and in an embodiment is a 10-bit integer representation, and in an embodiment a signed integer vector with 10-bit precision representation.

The Applicants have recognised in this regard that, as will be discussed further below, for some of the determinations when projecting the 3D texture coordinate derivative vectors to a coordinate system for a 2D plane defined by those vectors, only the direction of the vectors is of importance (since, e.g., the vectors may be later normalised in any event), and so a lower precision representation that still provides a sufficiently accurate indication of the direction of the texture coordinate derivative vectors can (safely) be used.

Where the initial texture coordinate derivative vectors are provided in a floating point format, and are to be converted into a (reduced precision) integer format, that conversion can be performed in any suitable and desired manner.

In an embodiment, this is done by scaling the floating point component values for the texture coordinate derivative vector in question to a common exponent (in an embodiment the largest exponent for the component values), and then using the appropriate upper N (e.g. 10) bits of each of the mantissas of the floating point component values when scaled in this fashion for the integer representations of the components of the reduced precision representation of the texture coordinate derivative vector.

In an embodiment, the conversion to a reduced precision integer representation is performed as follows: for the 3D texture coordinate derivative vector (u, v, w) (where u, v and w are in a floating point format), find the value of u, v and w with the largest exponent, and then use the upper N-bits of the mantissa for that value as the first N-bit integer component of the resulting reduced precision derivative vector. Then compute the difference between the exponents of the other values and the largest exponent and right shift the mantissas of the other values according to the exponent difference. Then use the upper N-bits of the resulting shifted mantissa values as the other components of the resulting reduced precision derivative vector. Where the corresponding floating point values were negative (had their sign bit set), then finally apply 2's-complement negation to the components to give the output reduced precision derivative vector.

This should be done for each initial 3D texture coordinate derivative vector, to accordingly provide a pair of reduced precision texture coordinate derivative vectors.

Once the reduced precision representations, dTdx', dTdy', of the texture coordinate derivative vectors have been determined, then those reduced precision texture coordinate derivative vectors are used to determine appropriate coordinate axis vectors, aniso_x_axis, aniso_y_axis, for a 2D coordinate system in the plane (through the 3D texture) defined by the texture coordinate derivatives. This can be done using the reduced precision representations, dTdx', dTdy', of the texture coordinate derivative vectors in any suitable desired manner.

In an embodiment, one of the axes in the 2D coordinate system for the plane defined by the texture coordinate derivative vectors is set to be parallel to one of the (reduced precision) texture coordinate derivative vectors and in an embodiment to be parallel to the texture coordinate derivative vector for the "X" direction. Thus, in an embodiment, one of the coordinate axes for the 2D coordinate system in the plane defined by the texture coordinate derivative vectors is set to be parallel to the reduced precision representation of the "X" texture coordinate derivative vector, dTdx'.

The other axis vector (the y axis vector) for the 2D coordinate system for the plane defined by the texture coordinate derivative vectors is in an embodiment then determined as a vector in that plane that is perpendicular to the first (e.g. x) axis.

This again may be determined as desired, but is in an embodiment determined by first deriving a vector which is orthogonal to the two reduced precision representations of the texture coordinate derivative vectors (which orthogonal vector will correspondingly be a normal vector to the plane defined by the texture coordinate derivative vectors), and then determining a vector which is orthogonal to that normal vector and the texture coordinate derivative vector that has been set as representing the other (e.g. x) axis in the 2D coordinate system for the plane.

These orthogonal vectors may be, and are in an embodiment, determined by performing the appropriate cross product between the vectors in question.

Thus, in an embodiment, a vector, orthovec, indicating the direction of one axis in the two-dimensional coordinate system for the plane defined by the texture coordinate derivative vectors is determined as follows:

$$orthovec = dTdx' \times (dTdx' \times dTdy')$$

where dTdx' is the reduced precision representation of the texture coordinate derivative vector dTdx, and dTdy' is the reduced precision representation of the texture coordinate derivative vector dTdy; and orthovec is a vector representing the "y" axis direction in the 2D coordinate system for the plane defined by the texture coordinate derivative vectors (with the "x" axis corresponding to dTdx').

In the case where the reduced precision representations of the texture coordinate derivative vectors are in the form of signed integer vectors at least, the above determination of orthovec (two cross-products) will have a significantly reduced cost (as compared to performing these calculations in floating point format). In particular, the determination will comprise a series of:

$$r = a * b - c * d$$

operations, which can be, and is in an embodiment, implemented in hardware as a Carry-Save Adder (CSA) tree.

The Applicants have further recognised in this regard that the result of the first cross-product in this determination will have a precision 2*N bits (because of the multiplication). This is accordingly in an embodiment reduced to N bits precision, e.g. and in an embodiment, by left-shifting all the components of the resulting vector by the same number of bits (for as much as possible while avoiding overflowing the 2*N bits available), with the lower N bits of each component then being discarded to provide an N-bit direction vector. The second cross-product followed by a corresponding N-bit renormalisation should be, and is in an embodiment, then performed.

This will then provide two vectors, dTdx' and orthovec, indicating the directions of the (x and y) coordinate axes in the 2D plane defined by the texture coordinate derivative vectors in a reduced precision (e.g. N-bit signed integer) format.

In an embodiment, normalised (unit) vectors representing the coordinate axes in the 2D coordinate system for the plane defined by the texture coordinate derivative vectors are determined. Thus, once the vectors defining the axes have been determined, they are in an embodiment normalised, i.e.:

$$\text{aniso\_x\_axis} = dTdx' / |dTdx'|$$

$$\text{aniso\_y\_axis} = orthovec / |orthovec|.$$

The determination of the unit vectors representing the axes can be implemented as desired. In an embodiment, the squared length of the vectors is first determined. This determination corresponds to:

$$r = x * x + y * y + z * z.$$

Again at least in the embodiment where the values are N-bit integers, this can be, and is in an embodiment, implemented in hardware as a CSA tree (which is highly efficient).

The squared length of the vectors is then used to determine a respective scale factor:

$$scale = 1.0 / sqrt(x * x + y * y + z * z).$$

This determination (of y=1.0/sqrt(x)) can be done as one, again particularly cost-effective, operation. For example a piecewise-linear approximation that uses a small lookup table with a subsequent multiply-add computation is in an embodiment used.

The reduced precision axis direction vectors are in an embodiment then multiplied by their respective scale factors to normalise them, i.e. to provide the required unit vectors, aniso_x_axis, aniso_y_axis, indicating the direction of the (x and y) coordinate axes in the 2D plane defined by the texture coordinate derivative vectors.

Once the vectors, aniso_axis_x, aniso_axis_y, describing the directions of the x axis and the y axis of the 2D coordinate system for the plane defined by the texture coordinate derivative vectors have been determined in the above manner, those "axis" vectors are then used, together with representations of the texture coordinate derivative vectors, to determine projected texture coordinate derivative vectors, dTdx_proj, dTdy_proj, corresponding to the projection of the texture coordinate derivative vectors dTdx, dTdy in the 3D coordinate system of the 3D texture in the 2D coordinate system of the plane defined by the 3D texture coordinate derivative vectors.

The projection of the 3D texture coordinate derivative vectors to the 2D plane using representations of the texture coordinate derivative vectors and the vectors representing the axes of the coordinate system in the 2D plane can be determined in any suitable and desired manner.

As discussed above, this determination should at least, and in an embodiment does, determine components for each projected texture coordinate derivative vector along both the respective (x and y) axis directions in the 2D coordinate system of the plane defined by the texture coordinate derivative vectors (rather than, for example, assuming that any of the components in the axis directions for the projected texture coordinate derivative vectors are 0).

(As discussed above, this then allows for the fact that the axis vectors for the 2D coordinate system for the plane defined by the texture coordinate derivative vectors are determined using lower precision representations of the texture coordinate derivative vectors.)

In an embodiment, the relevant axis direction components of the texture coordinate derivative vectors in the 2D coordinate system of the plane defined by the texture coordinate derivative vectors are determined by determining the dot product of an appropriate representation of the texture coordinate derivative vector in the 3D coordinate system of the 3D texture with the determined (unit) axis direction vectors for the 2D coordinate system of the plane defined by the 3D texture coordinate derivative vectors.

Thus, in an embodiment, the projections of the texture coordinate derivative vectors in the 2D coordinate system of the plane defined by the texture coordinate derivative vectors are determined as follows:

$$\text{dTdx\_proj} = (dot(dTdx'', \text{aniso\_x\_axis}), dot(dTdx'', \text{aniso\_y\_axis}), 0)$$

$$\text{dTdy\_proj} = (dot(dTdy'', \text{aniso\_x\_axis}), dot(dTdy'', \text{aniso\_y\_axis}), 0).$$

where dTdx_proj, dTdy_proj are the respective projected texture coordinate derivative vectors in the 2D coordinate system of the plane defined by the texture coordinate derivative vectors;

aniso_x_axis and aniso_y_axis are the unit vectors defining the directions of the respective x and y axes in the 2D coordinate system of the plane defined by the texture coordinate derivative vectors; and dTdx" and dTdy" are representations of the texture coordinate derivative vectors in the 3D coordinate system of the 3D texture (as will be discussed further below, the texture coordinate derivative vectors in the 3D coordinate system of the 3D texture could be represented in this determination using their full, e.g. FP32, precision that they are initially determined in, or a reduced precision representation of the texture coordinate derivative vectors in the 3D coordinate system of the 3D texture could be used (which is in an embodiment a reduced precision floating point representation of the initial texture coordinate derivative vectors dTdx, dTdy in the 3D coordinate system of the 3D texture)).

In an embodiment, the projected texture coordinate derivative vectors are determined in (using) floating-point precision.

This may be (and in one embodiment is) in the same floating-point precision as the original texture coordinate derivative vectors in the 3D coordinate system of the 3D texture (e.g. FP32 precision). Alternatively, in other embodiments, the projected texture coordinate derivative vectors are determined in (and using) a lower precision floating-point format.

In order to facilitate this, in an embodiment when determining the projected texture coordinate derivative vectors, the representations of the texture coordinate derivative vectors in the 3D coordinate system in the 3D texture, dTdx ", dTdy", are represented in a floating-point format (using floating-point precision).

In one embodiment the texture coordinate derivative vectors are represented and used in their original (e.g. FP32) floating-point format. (In this case, dTdx"=dTdx, and dTdy"=dTdy.)

However, the Applicants have recognised in this regard that in practice when projecting the texture coordinate derivative vectors to the 2D coordinate system of the plane defined by the texture coordinate derivative vectors in this manner it is not necessary to use a floating-point representation for the texture coordinate derivative vectors at the same level of precision as the texture coordinate derivative vectors are initially defined in. Thus, for example, while the texture coordinate derivative vectors should be and are in an embodiment defined in a floating-point format for the "projection" determination, it is not, for example, necessary for the texture coordinate derivative vectors to be represented and defined in their initial, e.g. FP32 format, for example.

Thus, in an embodiment, when using the determined axis vectors together with the texture coordinate derivative vectors to determine a projection of the texture coordinate derivative vectors to the 2D coordinate system for the plane defined by the texture coordinate derivative vectors, a reduced precision floating-point representation of the texture coordinate derivative vectors is used. In this case therefore, dTdx" and dTdy" will comprise reduced precision floating-point representations of the initial 3D texture coordinate derivative vectors dTdx, dTdy, respectively.

The Applicants have identified in this regard that again a lower precision floating-point representation of the texture coordinate derivative vectors can be used for the "projection" process, thereby allowing that process to be performed at a lower cost, without any significant detriment to the overall output result of the anisotropic texture filtering process.

In this case, any suitable and desired reduced precision floating point representation of the texture coordinate derivative vectors can be used.

In an embodiment, the reduction in precision is achieved by reducing the precision (the number of bits) used for the mantissa in the floating-point representations of the texture coordinate derivative vectors (of their components). For example, in the case where the texture coordinate derivative vectors are initially defined in FP32 precision, in an embodiment the reduced precision representations of the texture coordinate derivative vectors that are used for this determination are determined by reducing the mantissa from 23-bits (as it is in FP32) to 16-bits.

In an embodiment when determining the reduced precision floating-point representation for the texture coordinate derivative vectors by reducing the precision (the number of bits) used for the mantissa, the exponent width is increased, e.g., and in an embodiment, by 1-bit. Thus, for example, in the case of reducing the precision of an FP32 representation of the texture coordinate derivative vectors, the exponent width is in an embodiment increased from 8 to 9-bits. This helps to avoid any floating-point underflow/overflow that may introduce errors/artefacts.

Thus, in an embodiment, where the texture coordinate derivative vectors dTdx, dTdy are initially defined in a FP32 format, the determination of the projected texture coordinate derivative vectors dTdx_proj, dTdy_proj in the 2D coordinate system of the plane defined by the texture coordinate derivative vectors is in an embodiment performed using a 26-bit floating-point format, with 1 sign-bit, 9 exponent bits and 16 mantissa bits, representation for the texture coordinate derivative vectors (for dTdx ", dTdy").

Other arrangements would, of course, be possible.

The actual determination of the projected texture coordinate derivative vectors using the (e.g. reduced precision) floating-point representations for the texture coordinate derivative vectors and the vectors representing the axes in 2D coordinate system of the plane defined by the 3D texture coordinate derivative vectors to determine the projected texture coordinate derivative vectors using floating-point precision can be performed in any suitable and desired manner.

For example, where the axis vectors, aniso_x_axis, aniso_y_axis, in the 2D coordinate system for the plane defined by the texture coordinate derivative vectors are represented in an integer format, those integer representations could first be converted back to a floating point representation, with the determinations then being done using that floating point representation of the "2D" axis vectors together with a floating point representation for the texture coordinate derivative vectors (and in one embodiment this is what is done). The conversion of the "2D" axis vectors from an integer format to a floating-point format in this case can be performed in any suitable and desired manner.

Alternatively, the "2D" axis vectors could be left in their integer format and appropriately multiplied with the floating-point texture coordinate derivative vectors using an appropriate floating point and integer multiplication process (hardware). This may in particular be done, e.g., and in an embodiment, where the graphics processor and graphics processing system in question supports (and, e.g., includes hardware for) floating point by integer multiplication.

While it would be possible to perform the texture coordinate derivative vector projection, etc., in the manner of the technology described herein whenever a 3D texture is to be anisotropically sampled, the Applicants have recognised that there may be certain circumstances where the "full" texture coordinate derivative vector projection process described and discussed above is not necessary.

Thus, in an embodiment, the "full" texture coordinate derivative vector projection process to thereby determine, inter alia, the anisotropy direction, discussed above, is performed selectively, and, e.g., and in an embodiment, not (is other than) performed and/or is modified, in dependence on whether a particular condition or conditions is met (or is not met).

In an embodiment, the above process for projecting the texture coordinate derivative vectors to the 2D coordinate system of the plane defined by the texture coordinate derivative vectors is not performed (is omitted) and/or is modified, in dependence upon (based on) particular, in an embodiment selected, in an embodiment predetermined, properties of the texture coordinate derivative vectors themselves. In an embodiment, when the texture coordinate derivative vectors have a particular property or properties, then the above-described "projection" determination is not performed (is other than performed), with the texture coordinate derivative vector projection being performed in an alternative/modified (and more efficient) manner instead.

This may be based on and use any suitable and desired property or properties of the texture coordinate derivative vectors. In an embodiment, the reduced precision texture coordinate derivative vectors are considered in this regard.

In an embodiment, when both of the reduced precision texture coordinate derivative vectors, dTdx', dTdy', are of zero length, then rather than determining the projected texture coordinate derivatives in the above manner, the projected texture coordinate derivatives are set to be zero, i.e. dTdx_proj=(0, 0, 0) and dTdy_proj=(0, 0, 0), with aniso_axis_x=(1, 0, 0) and aniso_axis_y=(0, 1, 0).

In an embodiment, where one of the reduced precision representations of the texture coordinate derivative vectors is zero (but the other reduced precision texture coordinate derivative vector representation is non-zero), then rather than determining the projected texture coordinate derivatives in the above manner, the zero length derivative is in an embodiment replaced with a unit length axis aligned derivative (which is then used with the non-zero reduced precision representation of the texture coordinate derivative vectors in the above process). In this case, the axis that the unit length axis aligned derivative is set to be aligned to is in an embodiment selected as the axis that has the smallest magnitude in the other (non-zero) texture coordinate derivative vector.

In an embodiment, when the reduced precision texture coordinate derivative vectors are parallel (which can be checked as desired, but is in an embodiment determined if (when) the result of their cross-product in the above projected texture coordinate derivative vector determination process is zero), then one of the reduced precision texture coordinate derivative vectors (and in an embodiment the "y" reduced precision texture coordinate derivative vector) is set to zero (i.e. dTdy'=(0, 0, 0)), with that zero length derivative then being replaced with a unit length axis-aligned derivative as discussed above (and the determination performed accordingly).

In an embodiment, when any component of the texture coordinate derivative vectors dTdx, dTdy in the 3D coordinate system of the 3D texture is infinity or "not a number" (NaN), then rather than determining the projected texture coordinate derivatives in the above manner, instead a default set of anisotropic sampling parameters is used, in an embodiment so as to cause one sample to be taken in the least detailed mipmap level which is available. For example, and in an embodiment, the anisotropy degree is set to one (causing one sample to be taken), the anisotropy direction vector is set to (0.0, 0.0 (although it will be ignored because of taking only one sample) and the level of detail is set to infinity (which will then be clamped to level of detail high clamps).

In an embodiment, when any components of the texture coordinate derivative vectors, dTdx, dTdy, are large or small enough to cause "not a number" (NaN) in the texture coordinate vector projection determinations, then again rather than determining the projected texture coordinate derivatives in the above manner, instead a default set of anisotropic sampling parameters is used, in an embodiment so as to cause one sample to be taken in the least detailed mipmap level which is available. For example, and in an embodiment, the anisotropy degree is set to one (causing one sample to be taken), the anisotropy direction vector is set to (0.0, 0.0 (although it will be ignored because of taking only one sample) and the level of detail is set to infinity (which will then be clamped to level of detail high clamps).

In an embodiment, it is determined whether the, in an embodiment reduced precision, representations of the 3D texture coordinate derivative vectors both have a same component that is zero for both (reduced precision) representations of the texture coordinate derivative vectors.

When the (reduced precision) texture coordinate derivative vectors both have a same component that is zero, then rather than determining the projected texture coordinate derivative vectors in the above manner, the other (non-zero) components of the texture coordinate derivative vectors are simply used directly as the (axis) components for the projected texture coordinate derivative vectors (with the x and y axes for the 2D coordinate system on the plane defined by the texture coordinate derivative vectors being set as respective unit vectors in the axis directions other than the axis direction of the component that is zero for both texture coordinate derivative vectors).

Thus, in an embodiment:
when the X-component of both texture coordinate derivative vectors is zero, the projected texture coordinate derivative vectors are set as: dTdx_proj=(dTdx.y, dTdx.z), dTdy_proj=(dTdy.y, dTdy.z), and the axis vectors are set as: aniso_axis_x=(0, 1, 0), aniso_axis_y=(0, 0, 1);
when the Y-component of both texture coordinate derivative vectors is zero, the projected texture coordinate derivative vectors are set as: dTdx_proj=(dTdx.x, dTdx.z), dTdy_proj=(dTdy.x, dTdy.z), and the axis vectors are set as: aniso_axis_x=(1, 0, 0) and aniso_axis_y=(0, 0, 1); and
when the Z-component of both texture coordinate derivative vectors is zero, the projected texture coordinate derivative vectors are set as: dTdx_proj=(dTdx.x, dTdx.y), dTdy_proj=(dTdy.x, dTdy.y), and the axis vectors are set as: aniso_axis_x=(1, 0, 0) and aniso_axis_y=(0, 1, 0).

The Applicants have recognised in this regard that in the case where the two input (3D) texture coordinate derivatives both have a least one component which is zero and the same component is zero for both reduced precision representations of those texture coordinate derivative vectors, then that means that both texture coordinate derivative vectors are in the same axis aligned (x/y, x/z or y/z) plane, which then means that the projection of the vectors on to that plane can be done more straightforwardly and simply.

The Applicants have further recognised in this regard that such situations where both texture coordinate derivatives have the same component having a value of zero may not be that uncommon, as it will occur, for example, if the Z-coordinate (or any other coordinate) for the texture lookup is the same for the sampling positions being considered (e.g. for all threads in a 2×2 quad for which the texture coordinate derivative vectors are being determined). This may arise, for example, where the 3D texture is being used for animation, with the Z-coordinate representing time.

The Applicants believe that such identification of situations where the projected texture coordinate derivative vectors can be more easily determined may be new and advantageous in its own right.

Thus, a further embodiment of the technology described herein comprises a method of performing anisotropic filtering when sampling a 3D texture to provide an output sampled texture value for use when rendering an output in a graphics processing system, the method comprising:

when determining an anisotropy direction along which to take samples in a 3D texture when sampling a 3D texture using anisotropic filtering to provide an output sampled texture value for a position X, Y in a render output using a pair of texture coordinate derivative vectors, dTdx, dTdy, in the coordinate system of the 3D texture for the position in the render output for which the texture is to be sampled:

determining whether the 3D texture coordinate derivative vectors both have a same component that is zero for both texture coordinate derivative vectors; and when it is determined that the texture coordinate derivative vectors both have a same component that is zero, determining projected representations, dTdx_proj, dTdy_proj, of the texture coordinate derivative vectors dTdx, dTdy, in a 2D coordinate system on the plane in the 3D texture defined by the texture coordinate derivative vectors dTdx, dTdy by:

using the other components of the texture coordinate derivative vectors directly as the components for the projected texture coordinate derivative vectors;

the method further comprising:

using the determined projected representations, dTdx_proj, dTdy_proj, of the 3D texture coordinate derivative vectors dTdx, dTdy, in the 2D coordinate system on the plane to determine an anisotropy direction along which to take samples in the texture;

transforming the so-determined anisotropy direction back to the coordinate system of the 3D texture to thereby determine an anisotropy direction in the 3D texture along which to take samples in the texture;

taking one or more samples along the determined anisotropy direction in the 3D texture; and using the sample or samples taken along the anisotropy direction in the 3D texture to provide an output sampled texture value for use for the position in the render output for which the texture is being sampled.

A further embodiment of the technology described herein comprises an apparatus for performing anisotropic filtering when sampling a 3D texture to provide an output sampled texture value for use when rendering an output in a graphics processing system, the apparatus comprising:

an anisotropy direction determining circuit configured to determine an anisotropy direction along which to take samples in a 3D texture when sampling a 3D texture using anisotropic filtering to provide an output sampled texture value for a position X, Y in a render output using a pair of texture coordinate derivative vectors, dTdx, dTdy, in the coordinate system of the 3D texture for the position in the render output for which the texture is to be sampled;

the anisotropy direction determining circuit configured to, when determining an anisotropy direction along which to take samples in a 3D texture when sampling a 3D texture using anisotropic filtering to provide an output sampled texture value for a position X, Y in a render output using a pair of texture coordinate derivative vectors, dTdx, dTdy, in the coordinate system of the 3D texture for the position in the render output for which the texture is to be sampled:

determine whether the 3D texture coordinate derivative vectors both have a same component that is zero for both texture coordinate derivative vectors; and when it is determined that the texture coordinate derivative vectors both have a same component that is zero, determine projected representations, dTdx_proj, dTdy_proj, of the texture coordinate derivative vectors dTdx, dTdy, in a 2D coordinate system on the plane in the 3D texture defined by the texture coordinate derivative vectors dTdx, dTdy by:

using the other components of the texture coordinate derivative vectors directly as the components for the projected texture coordinate derivative vectors;

the anisotropy direction determining circuit further configured to:

use the determined projected representations, dTdx_proj, dTdy_proj, of the 3D texture coordinate derivative vectors dTdx, dTdy, in the 2D coordinate system on the plane to determine an anisotropy direction along which to take samples in the texture; and transform the so-determined anisotropy direction back to the coordinate system of the 3D texture to thereby determine an anisotropy direction in the 3D texture along which to take samples in the texture;

the apparatus further comprising:

a texture sampling circuit configured to take one or more samples along a determined anisotropy direction in a 3D texture; and a sample combining circuit configured to use a sample or samples taken along an anisotropy direction in a 3D texture to provide an output sampled texture value for use for a position in a render output for which the texture is being sampled.

As will be appreciated by those skilled in the art, these embodiments of the technology described herein can, and in an embodiment do, include any one or more or all of the features of the technology described herein, as appropriate.

Thus, for example, in an embodiment, reduced precision representations of the (3D) texture coordinate derivative vectors are determined, and it is then determined whether those reduced precision representations of the 3D texture coordinate derivative vectors have a same component that is zero for both reduced precision representations of the texture coordinate derivative vectors.

Similarly, the x and y axes for the 2D coordinate system on the plane defined by the texture coordinate derivative vectors are in an embodiment set as respective unit vectors in the axis directions other than the axis direction of the component that is zero for both texture coordinate derivative vectors.

Correspondingly, in the case when it is determined that the (e.g. reduced precision representations of the) texture coordinate derivative vectors do not (other than) both have a same component that is zero, then the determination of the projected representations of the texture coordinate derivative vectors in the 2D coordinate system on the plane in the 3D texture defined by the texture coordinate derivative vectors is in an embodiment performed in a different manner, and in an embodiment in one of the manners discussed above for the other embodiments of the technology described herein.

The above-discussed processes for determining the projected texture coordinate derivatives in the 2D plane defined by the texture coordinate derivative vectors and for determining the vectors representing the coordinate axes in that 2D plane can be implemented (in hardware) in any suitable and desired manner. For example, it would be possible to implement hardware (circuits) that can produce the projected texture coordinate derivatives and the axis vectors in a single processing cycle if desired (and in one embodiment, that is what is done).

However, the Applicants have recognised that anisotropic filtering of 3D textures does not need to produce an output sampled texture value every cycle (to run at "full" throughput), and therefore that the above processes need not all be completed in a single cycle, but rather that it would be acceptable for it to take multiple processing cycles to produce the projected texture coordinate derivatives and the coordinate system access vectors.

In particular, the Applicants have recognised that there are likely to be other operations when performing anisotropic filtering in 3D textures that mean that the output sampled texture value result cannot be produced in a single cycle in any event, such that it would be acceptable for the above processes to take multiple cycles to perform. The Applicants have correspondingly recognised that performing the above processes over multiple cycles can significantly reduce the hardware cost for this processing.

Thus, in an embodiment, the apparatus and circuits for generating the projected texture coordinate derivatives in the 2D plane defined by the texture coordinate derivatives and the vectors indicating axis directions of the 2D coordinate system in that 2D plane is implemented as and configured as a multi-cycle pipeline. In an embodiment a multi-cycle pipeline with plural processing stages is used. In an embodiment, an 8-cycle multi-cycle pipeline, in an embodiment having three stages, is used.

In this case, the first stage of the pipeline is in an embodiment a single cycle stage that is configured to (and includes processing circuits configured to) convert the floating-point 3D texture coordinate input derivative vectors to an appropriate reduced precision integer representation of those vectors, and, in an embodiment, to determine if the resulting low precision derivative vectors are both in the same axis aligned plane (as discussed above).

In this embodiment, the second stage in an embodiment comprises an 8-cycle stage containing the following functional units (circuits): a cross product unit (circuit), a bit renormalisation unit (circuit) (to reduce the precision of the output of the cross product unit); a squarer-accumulator unit (circuit) (to determine r=a+b*b); and a unit (circuit) configured to determine 1.0/sqrt (a).

The final stage in this embodiment is in an embodiment then an 8-cycle stage containing the following functional units (circuits): a floating-point multiplier (in an embodiment two instances); a floating-point adder (in an embodiment two instances); and a scaler unit (circuit) (in an embodiment two instances).

In this embodiment, after 8 cycles of processing in this pipeline, the projected texture coordinate derivatives in the 2D plane defined by the texture coordinate derivatives, and the vectors indicating the axis direction of the axes in the 2D coordinate system for the plane (i.e. indicating the mapping of the 2D coordinate system back to 3D), for a texture sampling operation will have been generated.

Other arrangements are, of course, possible.

Once the projected texture coordinate derivative vectors, dTdx_proj, dTdy_proj, in the 2D coordinate system of the plane defined by the texture coordinate derivative vectors have been determined, then those projected texture coordinate derivative vectors are used to determine the appropriate anisotropic filtering parameters, including at least an anisotropy direction in the 2D plane defined by the texture coordinate derivative vectors, for use in determining how to sample, and to control the sampling of, the 3D texture.

This can be done using the projected texture coordinate derivative vectors in any suitable and desired manner. In an embodiment it is done in the normal manner for (and using the existing hardware/processes for) determining the anisotropic filtering parameters when anisotropically sampling a 2D texture in the graphics processor and graphics processing system in question. Thus, in an embodiment, the 2D plane defined by the (3D) texture coordinate derivative vectors is effectively treated as if it were a 2D surface (texture), with the projected texture coordinate derivative vectors then being the texture coordinate derivative vectors on that 2D texture surface, and being used to determine the anisotropic filtering parameters accordingly.

Thus the projected texture coordinate derivative vectors in the 2D coordinate system for the 2D plane defined by the 3D texture coordinate derivative vectors are in an embodiment used to (and the texture sampling apparatus comprises a circuit or circuits configured to) determine one or more parameters for an ellipse that is estimated and intended to correspond to the projection of the sampling position (pixel) for which the texture is being sampled onto the 2D plane defined by the 3D texture coordinate derivative vectors, and in particular, appropriate parameters for that ellipse that can then be used to control the anisotropic filtering process appropriately.

More particularly, it is in an embodiment assumed that the projection of a sampling position onto the 2D plane defined by the (3D) texture coordinate derivative vectors will be an ellipse of the form:

$$Ax^2 + Bxy + Cy^2 = F$$

where A, B, C and F are the ellipse coefficients, and x, y are the coordinates in the 2D plane (in the 2D coordinate system on the plane) of the position that is being "sampled".

The ellipse coefficients A, B and C are in an embodiment determined from the projected texture coordinate derivatives in the 2D coordinate system on the plane defined by the (3D) texture coordinate vectors, with the determined ellipse coefficients A, B and C then in an embodiment being used to determine the anisotropic filtering parameters, such as, and in an embodiment, at least an anisotropy direction for the anisotropic filtering process.

The projected texture coordinate derivative vectors (in the 2D coordinate system on the plane defined by the texture coordinate derivative vector) can be used to determine the ellipse coefficients A, B and C in any suitable and desired manner. In an embodiment, the ellipse coefficients A, B and C are determined from the projected texture coordinate derivative vectors as follows:

$$A = \mathrm{dTdx\_proj.}y^2 + \mathrm{dTdy\_proj.}y^2$$

$$B = -2*(\mathrm{dTdx\_proj.}x*\mathrm{dTdx\_proj.}y + dTdy.x*\mathrm{dTdy\_proj.}y)$$

$$C = \mathrm{dTdx\_proj.}x^2 + \mathrm{dTdy\_proj.}x^2$$

where x, y is the position in the 2D coordinate system for the plane defined by the (3D) texture coordinate derivative vectors for which an output sampled texture value is required.

The actual determination of the ellipse coefficients A, B, C from the projected texture coordinate derivative vectors, dTdx_proj, dTdy_proj, in accordance with the above calculations can be performed in any suitable and desired manner. It is in an embodiment performed in the existing manner for the graphics processor and graphics processing system in question.

Once the ellipse coefficients have been determined from the projected texture coordinate derivatives (however that is done), then an appropriate set of anisotropic filtering parameters is in an embodiment determined based on and using the so-determined ellipse (and ellipse coefficients). Again, this can be done in any suitable and desired manner, and is in an embodiment done in the normal manner for the graphics processor and graphics processing system in question.

The determined ellipse and ellipse coefficients should be, and are in an embodiment, (at least) used to determine an anisotropy direction in the 2D plane defined by the (3D) texture coordinate derivative vectors (i.e. a direction in that plane along which samples should be taken for the anisotropic filtering process).

The anisotropy direction along which the samples are taken can be determined in any suitable and desired manner.

In an embodiment, the anisotropy direction is based on, and in an embodiment corresponds to, the (direction of the) major axis of the assumed elliptical footprint of the sampling point to which the texture value is being applied. Thus, in an embodiment, the anisotropy direction comprises a determined major axis direction for an ellipse that corresponds to the projection of the sampling point onto the 2D plane defined by the texture coordinate derivative vectors. Other arrangements would, of course, be possible.

The major axis direction for the ellipse can be determined in any suitable and desired manner.

In an embodiment, a normalised vector (i.e. a vector having a magnitude of "one") in the major axis direction for the ellipse is determined and then used to represent and as the anisotropy direction along which to take samples in the texture.

In an embodiment, the axis (the X and Y) components, aniso_vec_x, aniso_vec_y, of the unit vector representing the anisotropy (the major axis) direction in the 2D plane defined by the texture coordinate derivative vectors are determined by first determining the axis (X and Y) components of a vector of arbitrary (of any) length corresponding to the direction of the major axis of the assumed elliptical projection of the sampling position onto the plane defined by the texture coordinate derivative vectors, and then normalising those components to provide the axis (X and Y) components for a unit vector corresponding to the direction of the major axis of the elliptical footprint of the sampling point as projected on to the plane defined by the texture coordinate derivative vectors.

Once the anisotropy direction vector in the 2D plane defined by the texture coordinate derivative vectors has been determined, then that anisotropy direction vector should be and is in an embodiment transformed back into the 3D coordinate space of the 3D texture. This can be done in any suitable and desired manner.

In an embodiment, the anisotropy direction vector is transformed back into the 3D coordinate space using the coordinate (X and Y) axis vectors, aniso_axis_x and aniso_axis_y, previously determined for the 2D coordinate system of the plane defined by the texture coordinate derivative vectors. In an embodiment, the transformed anisotropy direction vector is determined as the sum of multiplying the determined x axis component of the anisotropy direction vector in the 2D coordinate system of the plane defined by the texture coordinate derivative vectors by the x axis vector and multiplying the determined y axis component of the anisotropy direction vector in the 2D coordinate system of the plane defined by the texture coordinate derivative vectors by the y axis vector.

Thus in an embodiment:

$$\mathrm{aniso\_vec\_}3D = \mathrm{aniso\_vec.}x*\mathrm{aniso\_axis\_x} + \mathrm{aniso\_vec.}y*\mathrm{aniso\_axis\_y}$$

where aniso_vec_3D is the transformed anisotropy direction vector in the 3D coordinate space of the 3D texture (i.e. the (unit) vector in the 3D coordinate space of the 3D texture defining the anisotropy direction to be used);

aniso_vec.x and aniso_vec.y are the respective x and y components of the (unit) anisotropy direction vector determined in the 2D coordinate system of the plane defined by the texture coordinate derivative vectors; and aniso_axis_x and aniso_axis_y are the (unit) vectors defining the (x and y) axis directions in the 2D coordinate system for the plane defined by the texture coordinate derivative vectors.

In an embodiment, as well as (using the ellipse and ellipse coefficients determined) using the projected texture coordinate derivative vectors to determine an anisotropy direction, the projected texture coordinate derivative vectors (the so-determined ellipse and ellipse coefficients) are also used to determine an "anisotropy degree" (i.e. a number of positions to be sampled in the texture when performing the anisotropic filtering).

The anisotropy degree can be determined in any suitable and desired manner. In an embodiment, it is (at least) determined based on a (the) projected ellipse for the sampling position in the 2D plane defined by the 3D texture coordinate derivative vectors, and is in an embodiment determined based, at least in part, on, and in an embodiment corresponds to, the ratio of the (length (radius) of the) major axis of the assumed elliptical footprint of the sampling point to which the texture values being applied to the (length (radius) of the) minor axis of that assumed elliptical footprint of the sampling point. Other arrangements would, of course, be possible.

In an embodiment, as well as (using the ellipse and ellipse coefficients determined) using the projected texture coordinate derivative vectors to determine an anisotropy direction, the projected texture coordinate derivative vectors (the so-determined ellipse and ellipse coefficients) are also used to determine a "level of detail" (LOD) at which to sample the texture.

The level of detail at which the texture is to be sampled can be determined in any suitable and desired manner. In an embodiment, it is (at least) determined based on the projected ellipse for the sampling position in the 2D plane defined by the 3D texture coordinate derivative vectors, and is in an embodiment determined based, at least in part, on a determined length for the minor axis of the projected ellipse.

The determined level of detail (LOD) can be used to control the anisotropic filtering process in any suitable and desired manner. In an embodiment, the determined level of detail is used to select the level of detail (resolution) at which the 3D texture is sampled, and in an embodiment, which resolution "version" or "versions" of the 3D texture are sampled (in particular in the case where the 3D texture is provided in the form of a plurality of mipmaps). In an embodiment, the level of detail is used to determine which mipmap level or levels of the 3D texture are to be sampled for the anisotropic filtering operation.

In an embodiment, the projected texture coordinate derivative vectors (the ellipse and ellipse coefficients determined using the projected texture coordinate derivative vectors) are used to determine an anisotropy direction, an anisotropy degree and a "level of detail" (LOD) at which to sample the texture.

Once the anisotropy direction (in the 3D coordinate space of the 3D texture), the number of positions for which to sample the 3D texture (the anisotropy degree), and/or level of detail at which to sample the 3D texture (where required) have been determined, then samples should be, and are in an embodiment, taken along the anisotropy direction in the 3D texture based on the determined number of positions, at the desired level of detail (e.g. in the appropriate mipmap level or levels).

The determined level of detail (LOD) is in an embodiment used to select which mipmap level or levels of the texture to sample. In an embodiment, texture samples are taken from plural, e.g. (immediately) adjacent, levels in the mipmap hierarchy, with the (two) mipmap levels to sample from in an embodiment being selected and determined based on the level of detail (LOD) at which the texture is to be sampled.

Where the sampling of the texture comprises sampling plural mipmaps for the texture, the samples taken along the anisotropy direction in the (more detailed) mipmap level and in the (less detailed) mipmap level should be, and are in an embodiment, appropriately combined to provide an output sampled texture value for use.

Once the mipmap(s) to sample from have been selected, then an appropriate number of samples based on the determined anisotropy degree should be, and are in an embodiment, taken along the determined anisotropy direction in each mipmap level to be sampled.

This could comprise taking samples for the determined number of positions (anisotropy degree) along the anisotropy direction in the 3D texture (and in one embodiment that is the case), or it could comprise taking samples along the anisotropy direction in the texture for a number of positions that is not the same as (that differs from) the determined number of positions, but which is based on the determined number of positions (the determined anisotropy degree) (e.g. is determined using the determined number of positions (anisotropy degree)) (and in other embodiments, this is the case). Where plural mipmap levels are to be sampled, different numbers of samples may be, and are in an embodiment, taken in different mipmap levels.

The desired number of positions for which samples are taken can be arranged along the anisotropy direction in the texture (e.g. in a mipmap level) in any suitable and desired manner. In an embodiment, they are equally spaced along the anisotropy direction, and in an embodiment lie on the determined anisotropy direction. The samples are in an embodiment centred on the ellipse centre (thus, if two samples are taken, then they are in an embodiment placed along the anisotropy direction equally far on either side of the centre of the ellipse).

For example, the anisotropy direction vector may be, and is in an embodiment, used for offsetting the coordinates of the individual positions to be sampled along the anisotropy direction, e.g., and in an embodiment, by adding an anisotropy_vector*step_length between each sample. (The first sample position should be, and is in an embodiment, appropriately offset from the texture coordinate given by the application, so that the set of samples is centred on the texture coordinate given by the application.)

In one embodiment a single sample is taken for each position along the anisotropy direction that is to be sampled. In that case, that single sample is in an embodiment taken at the position in question.

In another embodiment, plural samples are taken for each position along the anisotropy direction that is to be sampled (and in an embodiment the same number of plural samples is taken at each position). In this case those plural samples are in an embodiment combined appropriately to provide a result sampled value for the position in question. The plural samples are in an embodiment arranged appropriately around the position for which the samples are being taken, such as, and in an embodiment in an appropriate "super-sampling" pattern around the position.

Each sample that is taken for a position along the anisotropy direction could be a single, point sample from the texture (e.g. corresponding to the value of the nearest texel).

However, in an embodiment, each sample that is taken for a position comprises a suitably filtered sample (a sample that is derived from plural texels in the texture), such as a trilinearly filtered sample (e.g., and in an embodiment, in accordance with the 3D texture filtering process for the graphics processing system in question) (and in one embodiment, this is what is done). In this case, one (or more) (e.g. trilinearly) filtered samples will be taken for each position along the anisotropy direction in each mipmap level.

The samples themselves can be taken from the texture (and the sampled values determined) in any suitable and desired manner. This is in an embodiment done in accordance with the way that textures are otherwise sampled in the graphics processor and graphics processing system in question (e.g. when performing anisotropic filtering or otherwise).

Once the samples in the texture have been taken, then those samples should be, and are in an embodiment, appropriately combined (e.g. in an appropriately weighted manner) to provide an output sampled texture value for use by the graphics processor (e.g. when generating the render output in question).

Once the output sampled texture value has been determined, then that can be, and is in an embodiment, provided for use to the appropriate element of the graphics processor and graphics processing pipeline (e.g. to the fragment shader) for use.

The output sampled texture value can be used in any suitable and desired manner, and should be, and is in an embodiment, used in accordance with the normal texture mapping operation and use of textures in the graphics processor and graphics processing system in question.

The output sampled texture value should correspondingly be used in accordance with and based on the data that the texture represents. Thus where the texture represents colour values (e.g. an image), the output sampled texture value may be used appropriately when rendering a sampling point in a render output (e.g. image, e.g. frame for display) that the graphics processor is rendering. Equally, where the texture represents other data values, such as light or shadow values, depth values, etc., then the output sampled texture value will be used appropriately, e.g. to determine and/or set lighting or shadow effects for the sampling position in question. Other arrangements would, of course, be possible.

In an embodiment, the technology described herein is implemented in the texture mapping stage (the texture mapper/the texture mapping circuit) of a graphics processor of the graphics processing system. Thus, in an embodiment, a graphics processor comprises a texture mapper (a texture mapping circuit), and the texture mapper of the graphics processor is operable to determine the various anisotropic filtering parameters discussed above, etc.

Thus, the technology described herein extends to, and in an embodiment comprises, a texture mapping circuit for a graphics processor that includes the apparatus of any of the embodiments of the technology described herein.

As well as the particular circuits necessary to perform the operation in the manner of the technology described herein, the texture mapper (texture mapping circuit) can otherwise include any suitable and desired circuits, units and stages for performing texture mapping operations, and perform the required texture mapping operations in any suitable and desired manner.

Thus it may, for example, and in an embodiment does, comprise one or more or all of: a texture filtering circuit for performing a texture filtering operation (and which can at least perform anisotropic filtering in the manner of the technology described herein, but in an embodiment also supports other filtering operations such as bilinear and trilinear filtering); a texture data fetching circuit operable to fetch data values for texture data elements to be used in a texture filtering operation (e.g., and in an embodiment, via an appropriate texture cache); a coordinate calculation circuit (stage); a level of detail computation circuit (stage); a texel selection circuit (stage); and an output result providing circuit (stage).

The operation in the manner of the technology described herein can be triggered in any suitable and desired manner. In an embodiment, it is performed in response to appropriate texture mapping requests (for a texture to be anisotropically sampled), e.g., and in an embodiment, that are made to the texture mapping stage (texture mapping circuit). Such requests can be triggered as required, for example, and in an embodiment, by the renderer (e.g. fragment shader) of the graphics processor and graphics processing pipeline, for example, in response to, and when, rendering operations require a texture mapping operation to be performed.

The anisotropic filtering operation in the manner of the technology described herein could be triggered automatically, e.g. whenever an anisotropic filtering texture mapping operation is required. Additionally or alternatively, the operation in the manner of the technology described herein could be allowed to be controlled by the application that is requiring the graphics processing (e.g. by exposing it to the API), such that an application (the application programmer) can then specify when anisotropic filtering should be performed in the manner of the technology described herein.

Other arrangements would, of course, be possible.

Although the technology described herein has been described above primarily with reference to a single, individual texture mapping and texture filtering operation (e.g. for a given sampling position in a render output), in practice when generating a render output, texture mapping operations will be repeated for plural render output sampling positions, e.g. across the entire area of a primitive being rendered. Thus the technology described herein is in an embodiment performed in respect of plural texture mapping operations, such as, and in an embodiment, for each of plural sampling positions in a render output being generated.

The operation in the manner of the technology described herein can be used for any suitable and desired form of texturing operation and graphics (or other) processing operation that may be performed using textures, such as, and in an embodiment, when generating frames (images) for display, but also when generating other, e.g. non-graphics, outputs.

Although it would be possible, whenever anisotropic filtering of a 3D texture is desired, to use reduced precision representations of the texture coordinate derivative vectors in the manner of the technology described herein, the Applicants have recognised that there may still be circumstances where a full precision determination of the anisotropic filtering parameters, etc., is desirable. For example, while the use of reduced precision representations may be acceptable when the render output is an image, in other situations, such as compute shading, a more mathematically precise determination may still be desirable. Thus, in an embodiment, it can be indicated and/or determined that a "full" precision determination of the anisotropic filtering parameters should be performed, with in that case an alternative mechanism, such as by execution of an appropriate shader program, then being used to determine the anisotropic filtering parameters, etc.

In general, subject to any specific requirements of the technology described herein, the various parameter representations and the calculations in the technology described herein can use any suitable and desired format and representations of the values (numbers) in question, such as floating point representations, integer representations, or shared exponent representations (where multiple values use the same shared exponent but have different individual integer (mantissa) values, for example). Other arrangements would, of course, be possible.

As well as the texture mapping apparatus of the technology described herein, the graphics processor may include any one or more or all of the processing stages, circuits and elements that a graphics processor (processing pipeline) can normally include. Thus, for example, the graphics processor may include a primitive setup circuit, a rasteriser (circuit) and/or a renderer (circuit). Additionally or alternatively, the graphics processor may be able to perform ray-tracing and/or hybrid ray-tracing.

In an embodiment, the graphics processor includes a renderer operable to perform graphics rendering operations, and the texture mapper is operable to perform graphics texturing operations in response to requests for graphics texturing operations from the renderer. The renderer is in an embodiment in the form of or includes a programmable fragment shader (that processes graphics fragments by executing fragment shader programs using respective execution threads for sampling positions of a render output being generated by the graphics processor).

The graphics processor (processing pipeline) may also contain any other suitable and desired processing stages and circuits that a graphics processing pipeline may contain such as a depth (or depth and stencil) tester(s), a blender, a tile buffer or buffers, a write out unit, etc.

The texture mapper and texture mapping apparatus could also be a co-processor of a CPU, for example (i.e. coupled with a CPU that executes a rendering pipeline, for example), if desired.

The graphics processor and/or texture mapping apparatus of the technology described herein may be, and typically will be, part of an overall graphics and/or data processing system. Thus, the technology described herein also extends to a data or graphics processing system having a graphics processor and/or texture mapping apparatus as described herein.

The data or graphics processing system may comprise a memory or memories (memory system) for storing the data etc., referred to herein, which may be external to the graphics processor and texture mapping apparatus. The memory or memories may be operable to store, and may store, set(s) of texture mipmaps to be used in the texturing operations.

Thus, as will be appreciated, embodiments of the technology described herein may be implemented in a data/graphics processing system comprising a memory and a graphics processing unit (GPU) (a graphics processor) comprising a texture mapping apparatus as described herein. In an embodiment, the data/graphics processing system may further include a host processor that executes applications that can require data or graphics processing by the graphics processor and that instruct the graphics processor accordingly (e.g. via a driver for the graphics processor). The system may further include appropriate storage (e.g. a memory), caches, etc.

The data/graphics processing system and/or graphics processor and/or texture mapping apparatus may also comprise, and/or be in communication with, one or more memories and/or memory devices that store the data described herein, and/or that store software for performing the processes described herein. The data/graphics processing system and/or graphics processor and/or texture mapping apparatus may also be in communication with a host microprocessor, and/or with a display for displaying images based on the data generated.

In one embodiment, the various functions of the technology described herein are carried out on a single data or graphics processing platform that generates and outputs the required data, such as processed image data that is, e.g., written to a frame buffer for a display device.

The technology described herein can be implemented in any suitable system, such as a suitably operable microprocessor based system. In some embodiments, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, the various functional elements, stages, units, and "means" of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that the various functions, etc., of the technology described herein may be duplicated and/or carried out in parallel on a given processor. Equally, the various processing stages may share processing circuits/circuitry, etc., if desired.

Furthermore, any one or more or all of the processing stages or units of the technology described herein may be embodied as processing stage or unit circuits/circuitry, e.g., in the form of one or more fixed-function units (hardware) (processing circuits/circuitry), and/or in the form of programmable processing circuitry that can be programmed to perform the desired operation. Equally, any one or more of the processing stages or units and processing stage or unit circuits/circuitry of the technology described herein may be provided as a separate circuit element to any one or more of the other processing stages or units or processing stage or unit circuits/circuitry, and/or any one or more or all of the processing stages or units and processing stage or unit circuits/circuitry may be at least partially formed of shared processing circuit/circuitry.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. Thus, further embodiments of the technology described herein comprise computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus further embodiments of the technology described herein comprise computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

A number of embodiments of the technology described herein will now be described in the context of texture mapping in a graphics processor in a data processing system.

Figure 5:
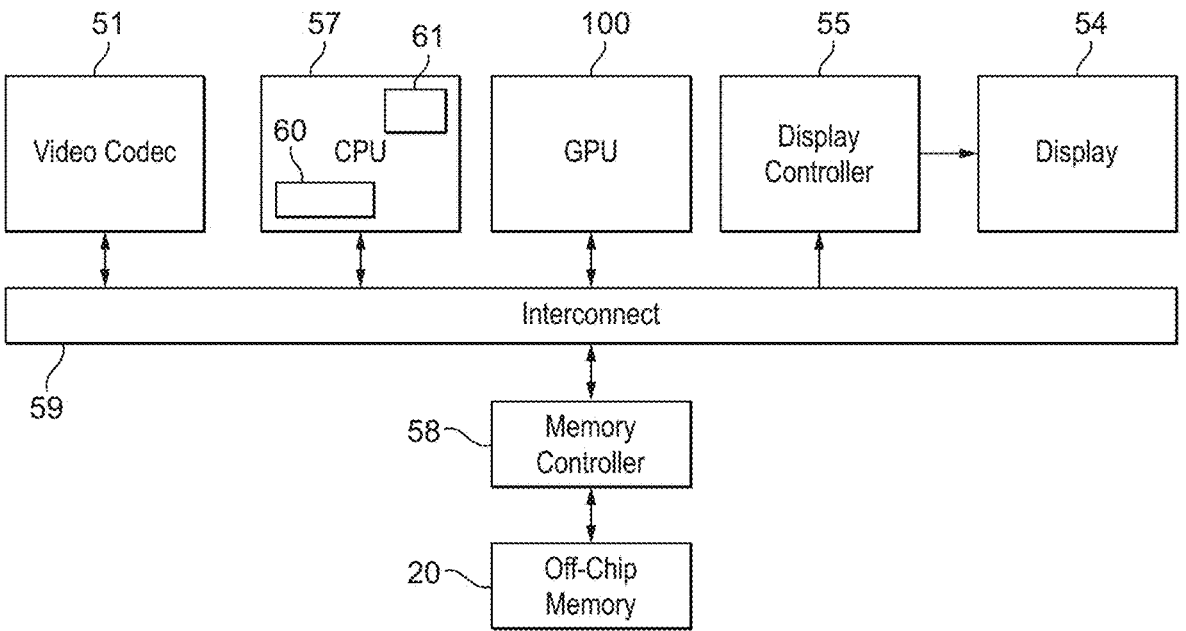
FIG. 5 shows an exemplary data processing system in which the technology described herein may be implemented.

FIG. 5 shows an exemplary data processing system in which the technology described herein and the present embodiments may be implemented.

Figure 3:
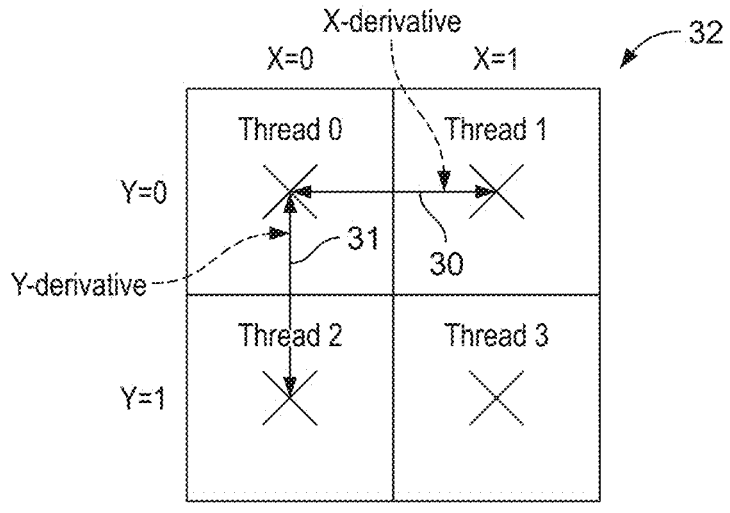
FIG. 3 illustrates the generation of texture coordinate derivatives.

The exemplary data processing system shown in FIG. 5 comprises a host processor comprising a central processing unit (CPU) 57, a graphics processor (GPU) 100, a video codec 51, a display controller 55, and a memory controller 58. As shown in FIG. 3, these units communicate via an interconnect 59 and have access to off-chip memory 20. In this system the GPU 100, video codec 51, and/or a CPU 57 will generate frames (images) to be displayed, and the display controller 55 will then provide the frames to a display 54 for display.

In use of this system, an application 60, such as a game, executing on the host processor (CPU) 57, will, for example, require the display of frames on the display 54. To do this, the application 60 will submit appropriate commands and data to a driver 61 for the graphics processor 100 that is executing on the CPU 57. The driver 61 will then generate appropriate commands and data to cause the graphics processor 100 to render appropriate frames for display and to store those frames in appropriate frame buffers, e.g. in the main memory 20. The display controller 55 will then read those frames into a buffer for the display from where they are then read out and displayed on the display panel of the display 54.

Figure 6:
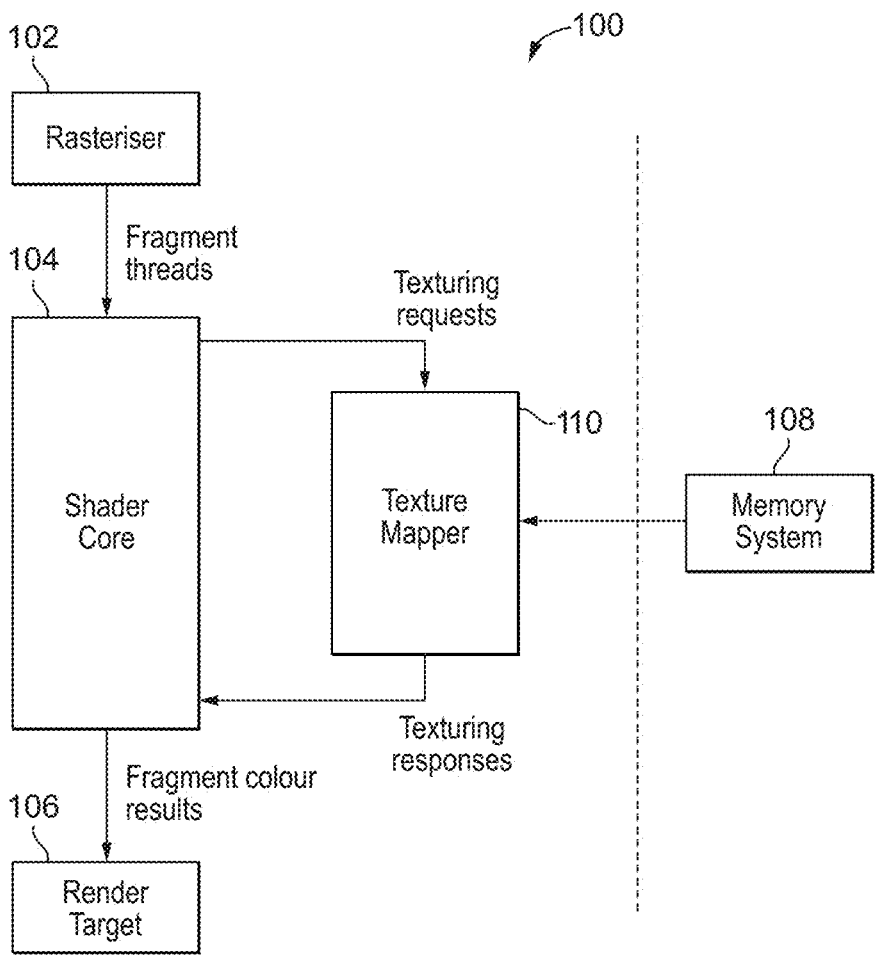
FIG. 6 shows schematically a graphics processor that includes a texture mapper.

FIG. 6 shows an exemplary graphics processor (graphics processing unit (GPU)) 100 that can perform texture mapping, that can be used in the data processing system of FIG. 5.

As shown in FIG. 6, the GPU 100 comprises data processing circuits that implement a graphics processing pipeline. The pipeline includes, inter alia, a rasterizer 102 and a renderer in the form of a programmable (fragment) shader core 104. The pipeline uses a buffer 106 (e.g. in external memory 108) for storing an output array (e.g. frame or image to be displayed).

The GPU 100 further comprises a texture mapper 110, and the memory 108 will also store, inter alia, graphics textures to be used by the GPU 100 when performing texture mapping operations.

In this system, the rasterizer 102 will rasterize input primitives into individual graphics fragments for processing. To do this, the rasterizer 102 rasterizes the primitives to sampling positions representing the render output, and generates graphics fragments representing appropriate sampling positions for rendering the primitives. Each fragment may represent a single sampling position or a set of plural sampling positions. The fragments generated by the rasterizer 102 are then sent onwards to the fragment shader (renderer) 104 for shading.

The fragment shader 104 executes shader programs for the fragments issued by the rasterizer 102 in order to render (shade) the fragments. The fragments are processed using execution threads in the shader core, with the threads executing the shader program(s) that are to be used to process the fragments. A thread is executed for each sampling position that is to be shaded.

A shader program may include texturing instructions for texture mapping operations that are required to be executed by the texture mapper 110.

When a texturing instruction is encountered by the fragment shader 104, a texturing instruction is sent from the fragment shader 104 to the texture mapper 110, requesting the texture mapper 110 to perform a texturing operation.

When requested by the fragment shader 104 to perform a texture mapping operation, the texture mapper 110 reads textures from the memory 108 (as required), performs the texture mapping operation, and returns a (e.g. RGB colour) value sampled from the texture back to the fragment shader 104, for use when shading the fragment and sampling position(s) in question.

The "shaded" fragment sampling positions from the fragment shader 104 are then stored as part of the output render target in the buffer 106, e.g. in the memory 108, e.g. for subsequent post-processing or display.

Figure 7:
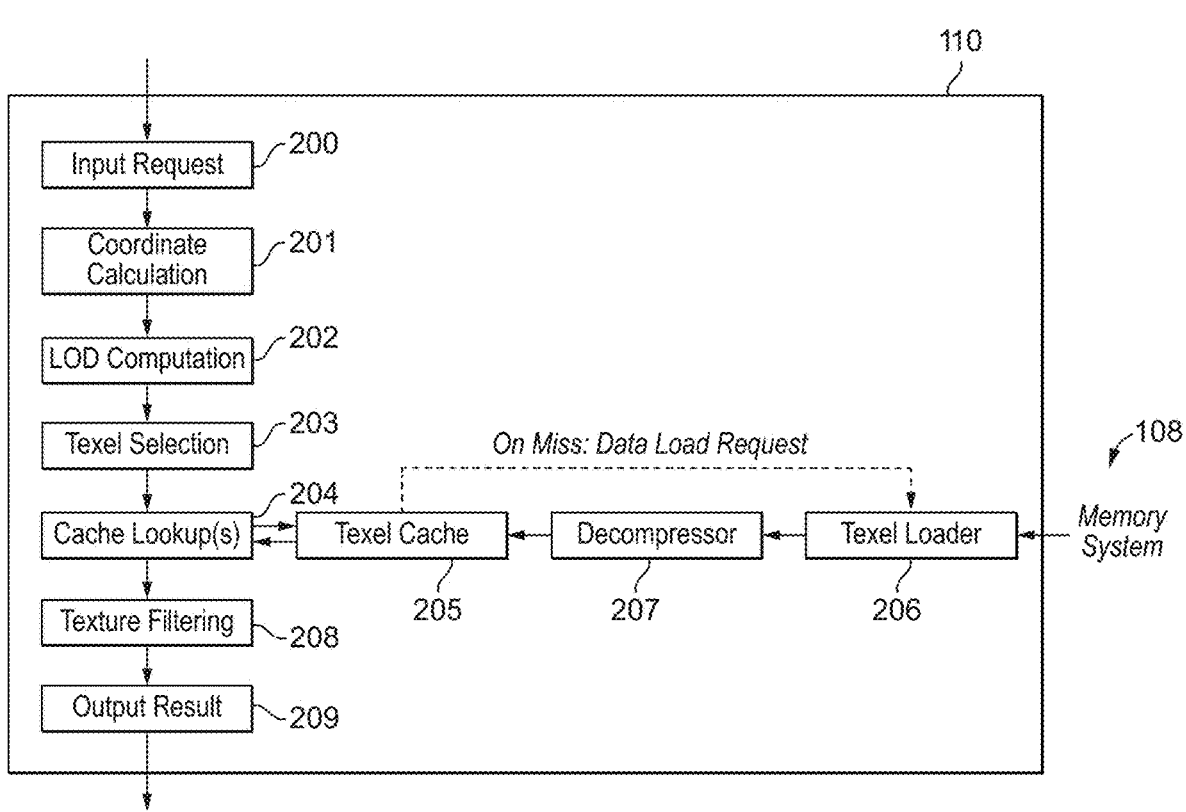
FIG. 7 shows schematically an exemplary graphics texture mapper in more detail.

FIG. 7 shows an exemplary texture mapper (texture mapping apparatus) 110 in more detail.

As shown in FIG. 7, the texture mapper 110 includes a number of processing stages (circuits), including an input request stage (circuit) 200 that accepts texture mapping operation requests from a renderer (e.g. the fragment shader 104 in FIG. 6). This is followed by a coordinate calculation stage (circuit) 201 that, for example, will convert an arbitrary coordinate included with a texture mapping operation request into an appropriate canonical coordinate between 0.0 and 1.0 to be used when sampling the texture.

There is then a level of detail (LOD) computation stage (circuit) 202, that can determine the level of detail at which the texture is to be sampled for the texture mapping operation (this selects the mipmap level(s) to use and how to filter between them in the case where the texture is in the form of mipmaps). This level of detail computation may not be necessary, for example where the fragment shader program itself can explicitly indicate the level of detail to be used, or a texture is not stored in the form of mipmaps.

There is then a texel selection stage (circuit) 203, which uses the coordinate determined by the coordinate calculation stage 201 to determine the actual texels (texture data elements) in the texture (and, if appropriate, the determined mipmap levels in the texture) to be used for the texture mapping operation.

The required texels (their data) are then fetched by a cache lookup stage (circuit) 204.

As shown in FIG. 7, although the texture data will be stored in the memory system 108, when that texture data is needed by the texture mapper 110, the texture data required for the texturing operation will be fetched from the memory 108 where it is stored, and first loaded into a texture cache 205 of or accessible to the texture mapper 110, with the texture mapper 110 then reading the texture data (by the cache lookup circuit 204) from the texel cache 205 for use.

As shown in FIG. 7, the texture mapper 110 may accordingly comprise a texel loader (a texel loading circuit) 206 that is operable to load data of texels from textures stored in the memory 108 for storing in the texel cache 205. There may also be a decompressor (decoder) stage (circuit) 207 that can decompress (decode) textures that are stored in a compressed (encoded) format in the memory system 108 before storing the texel values in the texel cache 205.

Once the required texels (texel data values) have been fetched from the texel cache 205, they are used in the required texture filtering operation by a texture filtering stage (circuit) 208 to generate an appropriate output result for the texture position (coordinate) being sampled, which output result is then appropriately packaged and returned to the fragment shader by an output result stage (circuit) 209. The texture filtering circuit 208 may, for example, perform any desired form of filtering using the fetched texel values, such as bilinear, trilinear, anisotropic, or any other form of filtering, to generate the desired filtered sample result.

Figure 2:
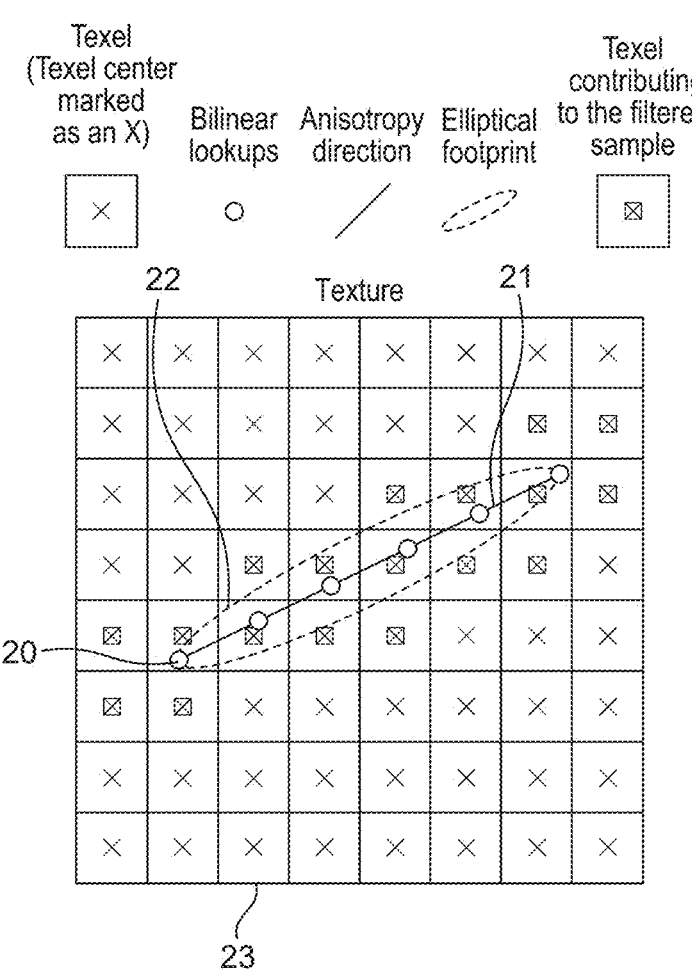
FIG. 2 shows an example of anisotropically sampling a texture.

The present embodiments relate in particular to the case where the texture mapper 110 is to perform anisotropic filtering to sample a texture. In this case, as illustrated in FIG. 2, samples may be taken for positions along a defined anisotropy direction.

Figure 8:
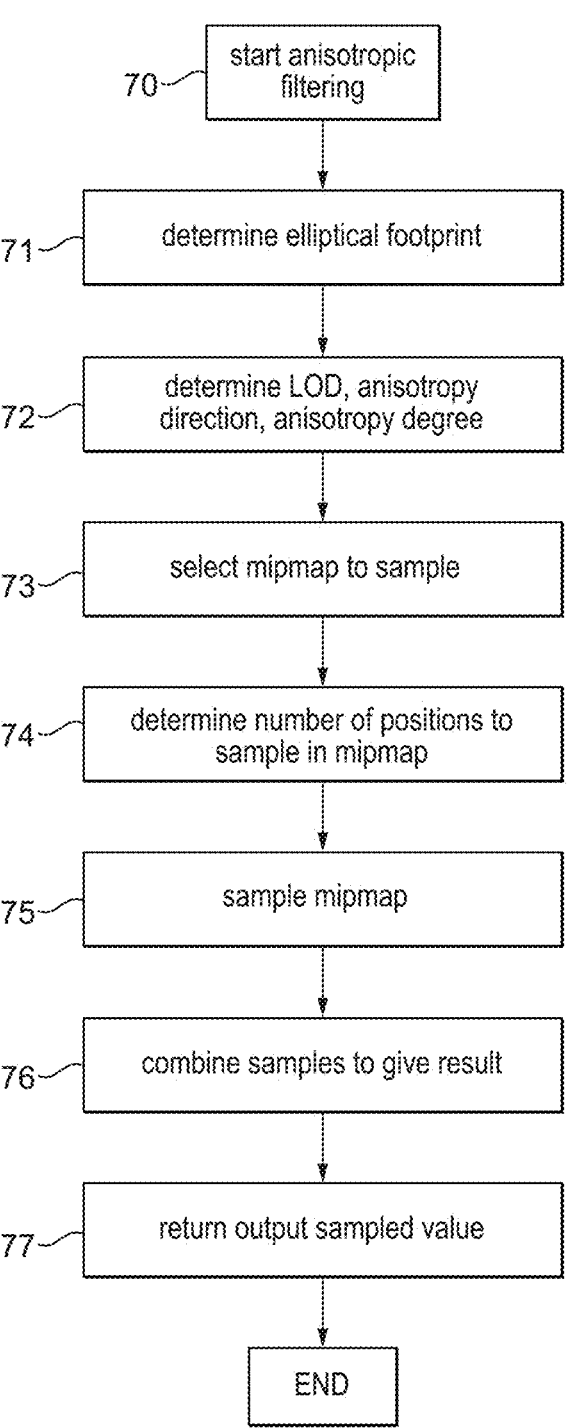
FIG. 8 is a flowchart showing a process for anisotropic filtering of a texture.

FIG. 8 shows the basic operation of the texture mapper 110 when performing anisotropic filtering in the present embodiments.

As shown in FIG. 8, when anisotropic filtering is to be performed (step 70), the texture mapper will first determine the appropriate parameters for the elliptical footprint that, in effect, corresponds to the projection of the sampling point onto the surface to which the texture is being applied (step 71).

The determined elliptical footprint (the parameters for the ellipse) is then used to determine a level of detail (LOD) at which to sample the texture, the anisotropy direction along which the texture will be sampled, and an "anisotropy degree", which represents a number of positions to sample along the anisotropy direction in the texture (step 72).

Once the level of detail at which to sample the texture, the anisotropy direction, and anisotropy degree have been determined, the mipmap to sample for the texture is selected (step 73).

The mipmap to sample is selected in accordance with the level of detail at which the texture is to be sampled.

It is then determined how many positions should be sampled in the mipmap (step 74).

The number of positions that are sampled in the mipmap level could be determined simply as (as equal to) the anisotropy degree determined from the ellipse parameters or it could be based on that determined anisotropy degree, but with some potential modification(s). For example, the number of positions to sample in the mipmap level could be determined based on both a determined "base" number of positions to sample (i.e. a "base" anisotropy degree) determined from the ellipse parameters, and the level of detail at which the texture is being sampled.

Once the number of positions along the anisotropy direction for which samples should be taken has been determined, samples for the determined number of positions are then taken in the selected mipmap (step 75).

Once the samples in the selected mipmap level have been taken, then those samples are used (combined) to provide an output sampled texture value for use by the (fragment shader of the) graphics processor (step 76). For example, a weighted average of the samples may be generated (based on the distances of the samples (positions) along the anisotropy direction from the centre of the major axis of the projected ellipse).

(It would also be possible to select and take samples from plural mipmap levels, if desired. In this case different numbers of samples may be taken in each different mipmap level.)

Other arrangements would, of course, be possible.

Once the output sampled texture value has been determined, that value is returned to the fragment shader for use (step 77).

As discussed above, the present embodiments use an estimated elliptical projection of the sampling point (pixel) to which the texture is to be applied to determine, inter alia, how many samples are to be taken in the texture, and where those samples should be taken from.

In the present embodiments, this is done based on and in accordance with the techniques described in: Paul S. Heckbert, Fundamentals of Texture Mapping and Image Warping (Masters thesis), Report No. UCB/CSD 89/516, Computer Science Division, University of California, Berkeley, June 1989, the entire contents of which is incorporated herein by reference.

Thus, in the present embodiments, a parametric circle in one coordinate system:

$$p = (x, y) = (\cos t, \sin t)$$

is used to represent a circular pixel on the "screen", with x and y representing the horizontal axis and vertical axis of the "screen", respectively. It is then assumed that this circle p is transformed to another coordinate system (the coordinate system of the texture, u, v) using a linear transform (matrix) M so that:

$$p' = pM = \begin{pmatrix} u & v \end{pmatrix} = \begin{pmatrix} \cos t & \sin t \end{pmatrix}\begin{pmatrix} u_x & v_x \\ u_y & v_y \end{pmatrix}$$

Such a linear transform transforms the circle in the first coordinate-system to an ellipse in the second coordinate system. The ellipse is centered on origo (0, 0) and passes through the points (ux, vx) and (uy, vy) (and these points correspond to parameter values t with a 90 degree phase difference).

This means that in the first coordinate system (the screen) the point (ux, vx) can be seen as the texture-coordinate of the neighboring pixel to the right and (uy, vy) can be seen as the texture coordinate of the neighboring pixel below the "current" pixel (the pixel for which the texture is to be sampled) on the screen, assuming that the "current" pixel has a texture-coordinate of (0, 0). (In other words, (ux, vx) is the partial derivative of the texture-coordinate in the X-direction on the screen and (uy, vy) is the partial derivative of the texture-coordinate in the Y-direction.)

The linear transform matrix M is then estimated by computing (ux, vx)=Tx−T0 (where Tx is the texture-coordinate of the neighboring pixel in the increasing x-direction and T0 is the texture-coordinate of the current pixel) and (uy, vy)=Ty−T0.

From this linear transform matrix M, the implicit ellipse coefficients, A, B, C, D, E and F can be found. (The implicit equation of a conic (of which an ellipse is one class) is:

$$Ax^2 + Bxy + Cy^2 + Dx + Ey - F = 0.)$$

In this case it is assumed that the projected ellipse will be centered on the origin, so the coefficients D and E will both be equal to zero, thus giving the canonical conic:

$$Ax^2 + Bxy + Cy^2 = F$$

The implicit equation for this ellipse can be found by substituting p=p'M$^{-1}$ into the identity $$pp^T = \cos^2 t + \sin^2 t = 1:$$

$$p'M^{-1}M^{-1^T}p'^T = 1$$

$$p'Qp'^T = 1$$

where $$Q =$$

$$M^{-1}M^{-1^T} = \frac{\begin{pmatrix} v_y & -v_x \\ -u_y & u_x \end{pmatrix}\begin{pmatrix} v_y & -u_y \\ -v_x & u_x \end{pmatrix}}{(u_x v_y - u_y v_x)^2} = \frac{\begin{pmatrix} v_x^2 + v_y^2 & -u_x v_x - u_y v_y \\ -u_x v_x - u_y v_y & u_x^2 + u_y^2 \end{pmatrix}}{(u_x v_y - u_y v_x)^2}$$

Q is the implicit conic matrix in quadratic form and is defined as:

$$pQp^T = F$$

$$(u \quad v)\begin{pmatrix} A & B/2 \\ B/2 & C \end{pmatrix}\begin{pmatrix} u \\ v \end{pmatrix} = F$$

Thus, the coefficients of the implicit ellipse function can be determined as follows:

$$A = vx^2 + vy^2$$

$$B = -2 * (ux * vx + uy * vy)$$

$$C = ux^2 + uy^2$$

$$F = (ux * vy - uy * vx)^2$$

As these basis-vectors of the ellipse (ux, vx) and (uy, vy) are not necessarily perpendicular to each-other (and there are, in fact, many different basis vectors that describe the same ellipse), a canonical set of basis vectors that correspond to the minor and major axis of the (projected) ellipse can be determined (and such that the lengths of the minor and major axis of the ellipse will be the lengths of those vectors, respectively).

The basis-vectors that correspond to the minor and major axis of the ellipse are found from the implicit ellipse coefficients A, B, C and F, by determining a new linear transform matrix M with orthogonal basis-vectors. This matrix can be written in the form:

$$M = \Lambda R = \begin{pmatrix} a & 0 \\ 0 & b \end{pmatrix}\begin{pmatrix} \cos\theta & \sin\theta \\ -\sin\theta & \cos\theta \end{pmatrix}$$

As noted above:

$$Q = M^{-1}M^{-1^T}$$

Thus in this case Q can be found as:

$$Q = M^{-1}M^{-1^T} = R^{-1}\Lambda^{-1}\Lambda^{-1^T}R^{-1^T} = R^{-1}\Lambda^{-2}R$$

since $\Lambda$ is diagonal and R is orthonormal. A and R are then extracted from the conic matrix Q (which is known from the preceding calculations). To do this, the diagonal form for Q is determined:

$$Q = S^{-1}AS$$

Where A is the diagonal matrix of the eigenvalues of Q and the columns of S are the corresponding eigenvectors. The eigenvectors are chosen to have unit length, so that R=S and $\Lambda^{-2}$=A can be equated.

The eigenvalues of the 2×2 symmetric matrix Q are:

$$A = \begin{pmatrix} \lambda_1 & 0 \\ 0 & \lambda_2 \end{pmatrix} = \begin{pmatrix} (q+t)/2 & 0 \\ 0 & (q-t)/2 \end{pmatrix}$$

where $$p = A - C$$

$$q = A + C$$

$$t = \operatorname{sgn}(p)\sqrt{p^2 + B^2}$$

and $$\operatorname{sgn}(x) = \begin{cases} -1 & x < 0 \\ +1 & x \geq 0 \end{cases}$$

When t≠0, The unit eigenvectors of Q are the columns of $$S = \begin{pmatrix} \sqrt{\dfrac{t+p}{2t}} & \operatorname{sgn}(Bp)\sqrt{\dfrac{t-p}{2t}} \\ -\operatorname{sgn}(Bp)\sqrt{\dfrac{t-p}{2t}} & \sqrt{\dfrac{t+p}{2t}} \end{pmatrix}$$

The eigenvectors of M are then given by A=A$^{-1/2}$.

$$a, b = \lambda_1^{-1/2}, \lambda_2^{-1/2} = \sqrt{\frac{2}{q \pm t}}$$

This means that the matrix M can be found as:

$$M = \begin{pmatrix} u_x & v_x \\ u_y & v_y \end{pmatrix} = \Lambda R$$

$$= \begin{pmatrix} \sqrt{\dfrac{2}{q+t}} & 0 \\ 0 & \sqrt{\dfrac{2}{1-t}} \end{pmatrix}$$

$$\begin{pmatrix} \sqrt{\dfrac{t+p}{2t}} & \operatorname{sgn}(Bp)\sqrt{\dfrac{t-p}{2t}} \\ -\operatorname{sgn}(Bp)\sqrt{\dfrac{t-p}{2t}} & \sqrt{\dfrac{t+p}{2t}} \end{pmatrix}$$

-continued $$= \begin{pmatrix} \sqrt{\dfrac{t+p}{t(q+t)}} & \mathrm{sgn}(Bp)\sqrt{\dfrac{t-p}{t(q+t)}} \\ -\mathrm{sgn}(Bp)\sqrt{\dfrac{t-p}{t(q-t)}} & \sqrt{\dfrac{t+p}{t(q-t)}} \end{pmatrix}$$

Where $$p = A - C$$

$$q = A + C$$

$$t = \mathrm{sgn}(p) * sqrt(p\wedge2 + B\wedge2)$$

Where $$p = A - C$$

$$q = A + C$$

$$t = \mathrm{sgn}(p) * \mathrm{sqrt}(p\,^2 + B\,^2)$$

This matrix M assumes that F=1, but as noted above, F is in fact: F=(ux*vy–uy*vx)^2.

Because of this, the matrix M is multiplied with F to find the actual correctly scaled orthogonal basis vectors for the ellipse:

$$ux' = F * sqrt((t + p)/(t * (q + t)))$$

$$vx' = F * \mathrm{sgn}(B * p) * sqrt((t - p)/(t * (q + t)))$$

$$uy' = -F * \mathrm{sgn}(B * p) * sqrt((t - p)/(t * (q - t)))$$

$$vy' = F * sqrt((t + p)/(t * (q - t)))$$

This can be seen as an orthogonalized set of derivative vectors.

From this it can be seen that the length of the vectors are:

$$lx = sqrt(ux'\wedge2 + vx'\wedge2) =$$

$$F * sqrt(((t + p)/(t * (q + t))) + ((t - p)/(t * (q + t)))) = F * sqrt(2/(q + t))$$

$$ly = sqrt(uy'\wedge2 + vy'\wedge2) =$$

$$F * sqrt(((t - p)/(t * (q - t))) + ((t + p)/(t * (q - t)))) = F * sqrt(2/(q - t))$$

The anisotropy degree is:

$$\mathrm{aniso\_degree} = \mathrm{major\_axis\_radius}/\mathrm{minor\_axis\_radius}$$

To determine this, it is determined which of lx and ly are the major and minor axis. It is known that q must be positive and t can be either positive or negative. If t is positive, then ly must be the major axis and lx must be the minor axis. If t is negative then lx must be the major axis and ly must be the minor axis. Thus, it can be defined:

$$T = \mathrm{abs}(t) = sqrt(p\wedge2 + B\wedge2)$$

$$\mathrm{major\_axis\_radius} = F * sqrt(2/(q - T))$$

$$\mathrm{minor\_axis\_radius} = F * sqrt(2/(q + T))$$

The anisotropy degree can then be determined as:

$$\mathrm{anisotropy\_degree} = sqrt((q + T)/(q - T))$$

And the level-of-detail (LOD) can be determined as:

$$LOD = \log2(\mathrm{minor\_axis\_radius}) =$$

$$\log2(F * sqrt(2/(q + T))) = \log2(F) + 0.5 - 0.5 * \log2(q + T)$$

The technology described herein and the present embodiments relate in particular to the anisotropic sampling of 3D textures. The way that the anisotropy degree, anisotropy direction, and level of detail are determined in accordance with the principles of the above-discussed techniques in the present embodiments when anisotropically sampling a 3D texture will now be described in more detail with reference to FIGS. 9, 10A, 10B, 10C, and 11.

Figure 9:
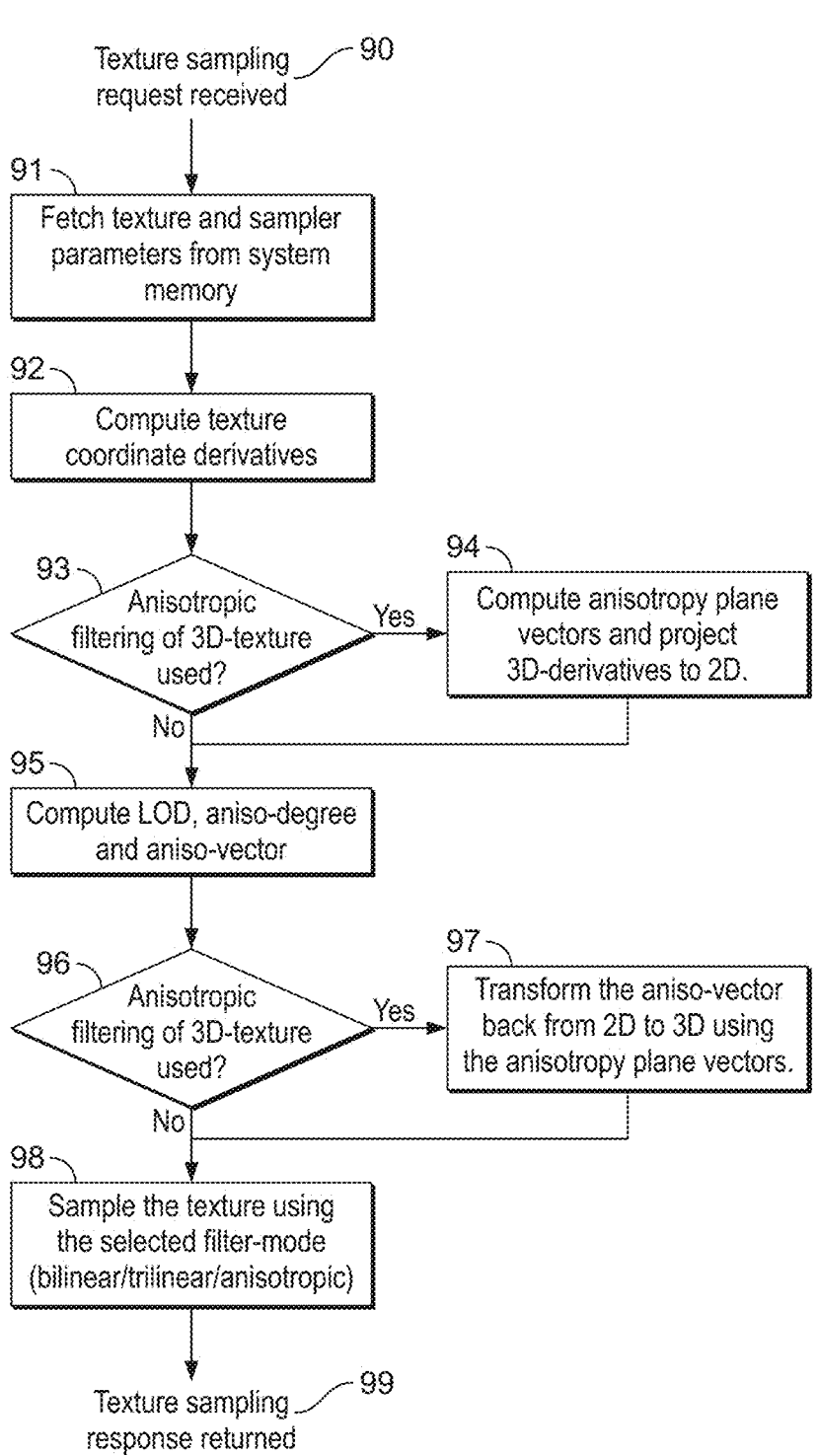
FIG. 9 is a flowchart showing a process for anisotropic filtering in an embodiment of the technology described herein.

FIG. 9 shows the overall process in the present embodiments that is performed by the texture mapper 110 to determine the anisotropic filtering parameters, namely the level of detail, the anisotropy degree and the anisotropy direction (essentially corresponding to the operation in the texture mapper in respect of steps 71 and 72 in FIG. 8) when anisotropically sampling a 3D texture.

The process in FIG. 9 starts when a texturing request for an anisotropically filtered texture sample arrives at the texture mapper (step 90). This essentially corresponds to step 70 in FIG. 8.

In response to the texture sampling request, the texture mapper will fetch the appropriate texture and sampler parameters, e.g. from memory (step 91).

The texture mapper will then determine the texture coordinate derivative vectors (step 92). (As discussed above, the determination of the elliptical footprint for the position being sampled starts by determining the derivatives of the texture coordinates for the position in the render output being sampled.)

In the present embodiments, the texture coordinate derivative vectors in the X and Y directions of the render target space (screen space) are determined by grouping sampling positions into 2×2 sampling position "quads". The X-derivative vector is then determined as the difference between the texture coordinates of the top two positions in the 2×2 quad, and the Y derivative vector is determined as the difference between the texture coordinates of the two left-hand position in the 2×2 quad.

Thus, in the present embodiment, the texture coordinate derivative vectors, dTdx, dTdy, in the 3D coordinate space of the 3D texture are determined as:

$$dTdx\,(x, y) =$$

$$(u(x + 1, y) - u(x, y), v(x + 1, y) - v(x, y), w(x + 1, y) - w(x, y))$$

$$dTdy\,(x, y) =$$

$$(u(x, y + 1) - u(x, y), v(x, y + 1) - v(x, y), w(x, y + 1) - w(x, y))$$

where
x, y is the position in the render output for which the texture is being sampled, and u, v, w are the coordinates in the 3D texture that are being sampled for the respective sampling positions in the render output.

It is then determined whether anisotropic filtering of a 3D texture is being performed (step 93). If so, then, as discussed above, the determined texture coordinate derivative vectors in the 3D coordinate system of the 3D texture are projected to a 2D coordinate system for the plane defined by the (3D) texture coordinate derivative vectors (step 94). This operation will be discussed in more detail below with reference to FIGS. 10A, 10B, and 10C.

Once the projected texture coordinate derivative vectors have been determined (or in the case where a 2D texture is being sampled such that there is no need to perform the projection operation), the projected (or un-projected, as appropriate) texture coordinate derivative vectors are then used to determine the anisotropic filtering parameters, namely the level of detail, anisotropy degree and anisotropy direction vector (step 95). This step corresponds essentially to steps 71 and 72 in FIG. 8. This operation will be described in more detail below with reference to FIG. 11.

Once the anisotropic filtering parameters have been determined, in the case of anisotropic filtering of a 3D texture (step 96), the determined anisotropy direction vector in the 2D plane defined by the (3D) texture coordinate derivative vectors is transformed back to the 3D coordinate system of the 3D texture (step 97). Again, this operation will be described in more detail below with reference to FIGS. 10A, 10B, and 10C.

Once the anisotropy direction vector has been transformed back to the 3D coordinate system of the 3D texture (or a 3D texture is not being sampled), then the determined anisotropic filtering parameters, namely the level of detail, anisotropy degree, and transformed anisotropy direction vector (or the "untransformed" anisotropy direction vector when a 3D texture is not being sampled), are used to appropriately sample the texture (step 98) and the texture sampling response is returned (step 99). This corresponds steps 75-77 in FIG. 8.

As discussed above with reference to FIG. 9, when sampling a 3D texture in the present embodiments, the texture coordinate derivative vectors determined in the 3D coordinate system of the 3D texture are projected to a 2D coordinate system for the 2D plane defined by the 3D texture coordinate derivative vectors, and then those projected texture coordinate derivative vectors in that 2D plane are used to determine the anisotropic filtering parameters that will set and control how the actual anisotropic filtering of the 3D texture is performed.

Figure 10A:
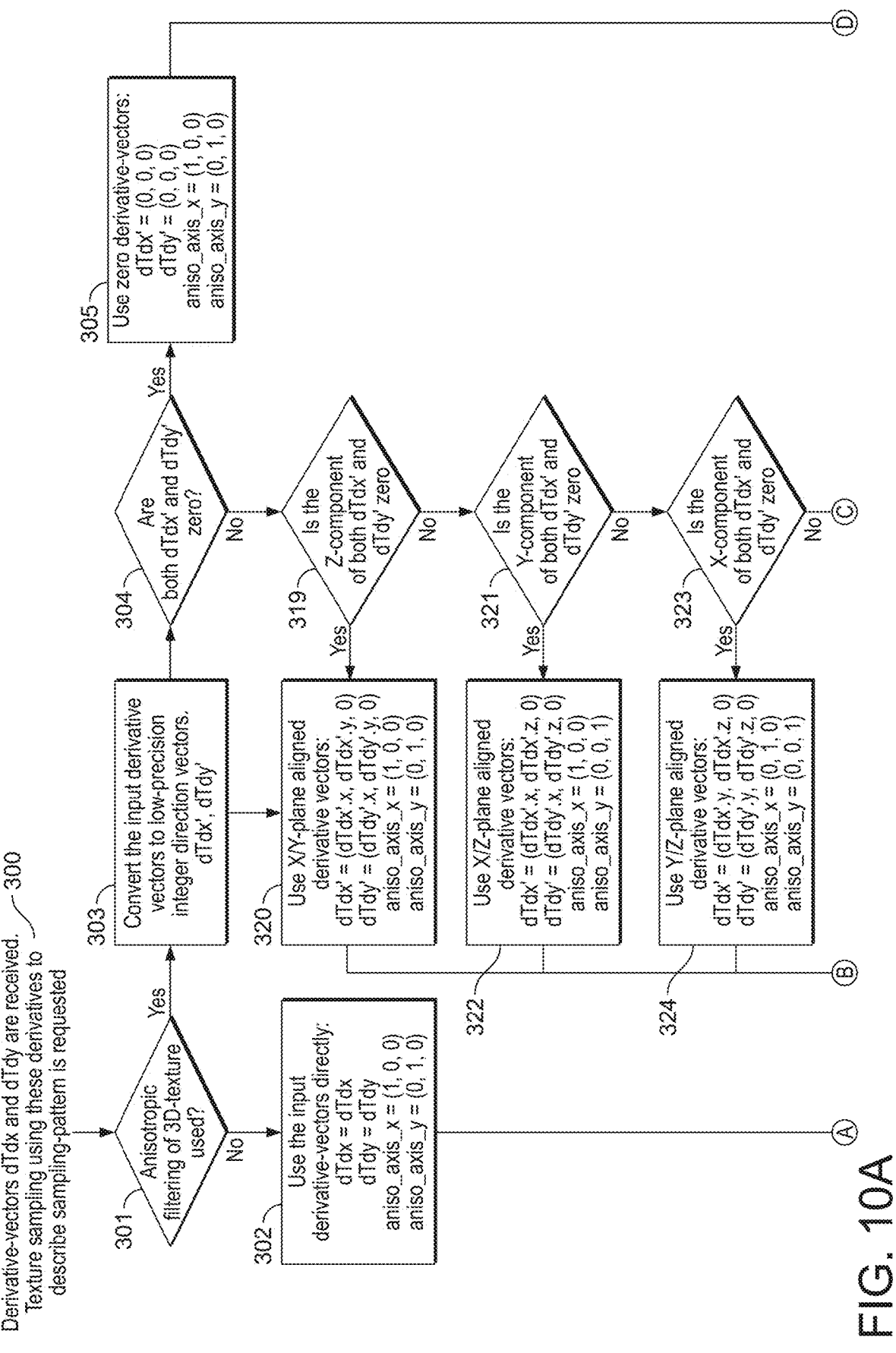
FIGS. 10A, 10B, and 10C are a flowchart showing embodiments of the process for anisotropic filtering of FIG. 9 in more detail.
Figure 10B:
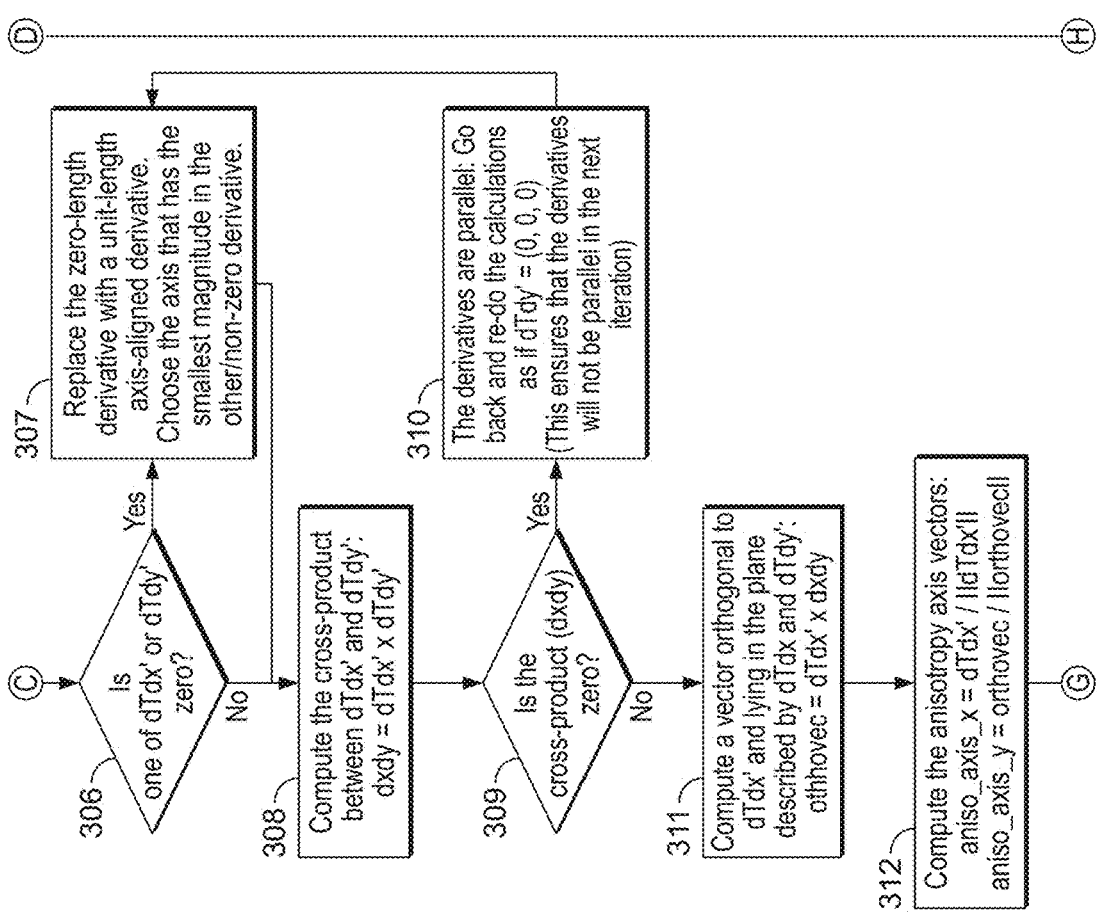
Figure 10B:
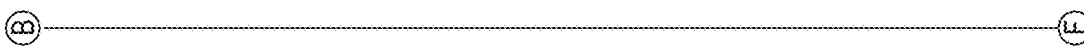
Figure 10B:
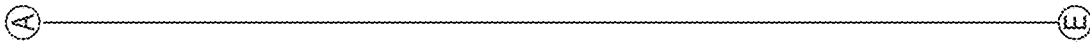
Figure 10C:
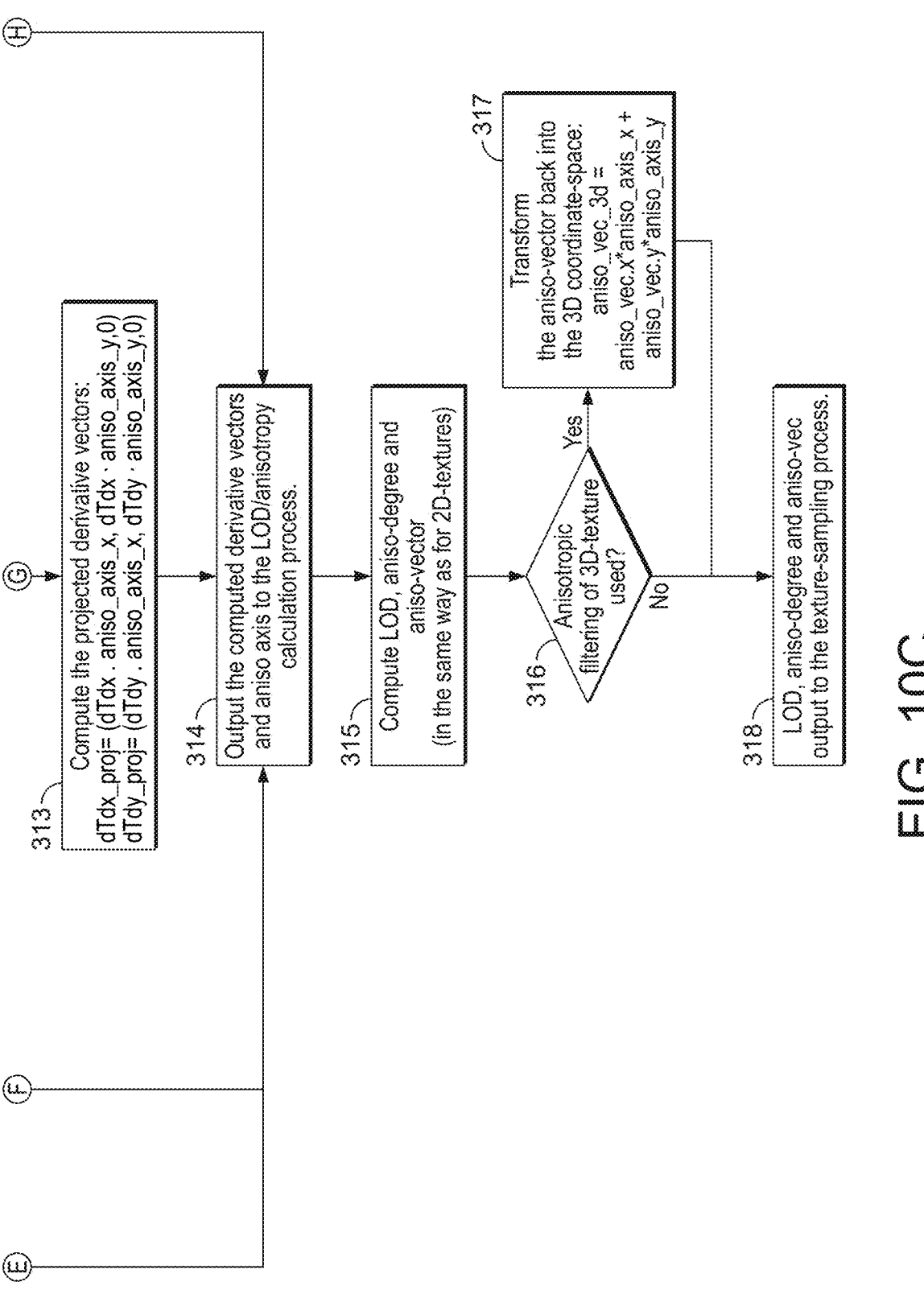

FIGS. 10A, 10B, and 10C show this operation in the present embodiments in more detail.

The process shown in FIGS. 10A, 10B, and 10C starts when the 3D texture coordinate derivative vectors, dTdx, dTdy, have been generated and anisotropic filtering of a 3D texture is being performed (steps 300, 301).

(As shown for completeness in FIGS. 10A, 10B, and 10C, in the case where anisotropic filtering of a 3D texture is not being performed (i.e. anisotropic filtering of a 2D texture is being performed), then the input texture coordinate derivative vectors are used directly for the anisotropic filtering parameter determination (step 302).)

As shown in FIG. 10A, in the case of anisotropically filtering a 3D texture, reduced precision representations dTdx', dTdy' of the initially determined texture coordinate derivative vectors dTdx, dTdy in the 3D coordinate system of the 3D texture are first determined (step 303).

In this regard, the texture coordinate derivative vectors in the 3D coordinate system of the 3D texture would typically initially be represented in a floating-point number format, such as using FP32 format. These representations of the texture coordinate derivative vectors are first converted to a lower precision format, which in the present embodiments comprises a signed integer format using 10-bit precision.

In the present embodiment, the conversion to a reduced precision integer representation is performed as follows: for the 3D texture coordinate derivative vector (u, v, w) (where u, v and w are in a floating point format), find the value of u, v and w with the largest exponent, and then use the upper 10-bits of the mantissa for that value as the first 10-bit integer component of the resulting reduced precision derivative vector. Then compute the difference between the exponents of the other values and the largest exponent and right shift the mantissas of the other values according to the exponent difference. Then use the upper 10-bits of the resulting shifted mantissa values as the other components of the resulting reduced precision derivative vector. Where the corresponding floating point values were negative (had their sign bit set), then finally apply 2's-complement negation to the components to give the output reduced precision derivative vector.

This is done for each initial 3D texture coordinate derivative vector, to accordingly provide a pair of reduced precision texture coordinate derivative vectors.

Other forms of reduced precision representations of the texture coordinate derivative vectors, and/or methods for generating the reduced precision representations of the texture coordinate derivative vectors, could be used if desired.

Once the reduced precision representations, dTdx', dTdy', of the texture coordinate derivative vectors have been determined, then those reduced precision texture coordinate derivative vectors are used to determine appropriate coordinate axis vectors, aniso_x_axis, aniso_y_axis, for a 2D coordinate system in the plane (through the 3D texture) defined by the texture coordinate derivative vectors. The so-determined coordinate axis vectors are then used together with appropriate representations of the texture coordinate derivative vectors to determine projected representations dTdx_proj, dTdy_proj of the texture coordinate derivative vectors in the 2D coordinate system in the plane defined by the texture coordinate derivative vectors. The so-determined projected texture coordinate derivative vectors are then used to determine the anisotropic filtering parameters (as will be discussed further below).

FIGS. 10A, 10B, and 10C show this operation in more detail.

As shown in FIG. 10A, when doing this it is first determined whether both of the reduced precision texture coordinate derivative vectors, dTdx', dTdy', are of zero length (step 304). If so, the projected texture coordinate derivative vectors are set to be zero, i.e. dTdx_proj=(0, 0, 0) and dTdy_proj=(0, 0, 0), with the axis vectors set accordingly: aniso_axis_x=(1, 0, 0) and aniso_axis_y=(0, 1, 0) (step 305).

When at least one of the reduced precision texture coordinate derivative vectors dTdx', dTdy', is not of zero length, it is then determined whether the z-components of both reduced precision texture coordinate derivative vectors are zero (step 319).

If so, x/y plane aligned projected texture coordinate derivative vectors are used, and the projected texture coordinate derivative vectors are set as: dTdx_proj=(dTdx'.x, dTdx'.y, 0), dTdy_proj=(dTdy'.x, dTdy'.y, 0), with the axis vectors set accordingly as: aniso_axis_x=(1, 0, 0) and aniso_axis_y=(0, 1, 0) (step 320).

If not, it is then determined whether the y-components of both reduced precision texture coordinate derivative vectors are zero (step 321).

If so, x/z plane aligned projected texture coordinate derivative vectors are used, and the projected texture coordinate derivative vectors are set as: dTdx_proj=(dTdx'.x, dTdx'.z, 0), dTdy_proj=(dTdy'.x, dTdy'.z, 0), with the axis vectors set accordingly as: aniso_axis_x=(1, 0, 0) and aniso_axis_y=(0, 0, 1) (step 322).

If not, it is then determined whether the x-components of both reduced precision texture coordinate derivative vectors are zero (step 323).

If so, y/z plane aligned projected texture coordinate derivative vectors are used, and the projected texture coordinate derivative vectors are set as: dTdx_proj=(dTdx'.y, dTdx'.z), dTdy_proj=(dTdy'.y, dTdy'.z), with the axis vectors set accordingly as: aniso_axis_x=(0, 1, 0), aniso_axis_y=(0, 0, 1) (step 324).

When none of the same components of both texture coordinate derivative vectors are both zero, it is then determined whether one of the reduced precision representations of the texture coordinate derivative vectors is zero length (but the other reduced precision texture coordinate derivative vector is non-zero) (step 306).

If one of the reduced precision representations of the texture coordinate derivative vectors is zero length, the zero length derivative vector is replaced with a unit length axis aligned derivative vector (step 307) (which is then used with the non-zero reduced precision representation of the other texture coordinate derivative vector). In this case, the axis that the unit length axis aligned derivative vector is set to be aligned to is selected as the axis that has the smallest magnitude in the other (non-zero) texture coordinate derivative vector.

As shown in FIGS. 10A, 10B, and 10C, in the case that at least one of the reduced precision representations of the texture coordinate derivative vectors is non-zero, then the reduced precision texture coordinate derivative vectors, dTdx', dTdy' (or one of the reduced precision texture coordinate derivative vectors, dTdx', dTdy', together with a unit length axis-aligned vector, as discussed above) are used to determine appropriate coordinate axis vectors, aniso_x_axis, aniso_y_axis, for a 2D coordinate system in the plane (through the 3D texture) defined by the texture coordinate derivative vectors. This is shown in steps 308-312 of FIGS. 10A, 10B, and 10C.

In the present embodiments, this is done by setting the x axis for the 2D coordinate system for the plane defined by the texture coordinate derivative vectors to be parallel to the (reduced precision) "X" texture coordinate derivative vector, dTdx'.

The other axis vector (the y axis vector) for the 2D coordinate system for the plane defined by the texture coordinate derivative vectors is then determined as a vector in that plane that is perpendicular to that "x" axis.

To do this, as shown in FIGS. 10A, 10B, and 10C, a vector dxdy which is orthogonal to the two reduced precision representation texture coordinate derivative vectors (which orthogonal vector will correspondingly be a normal vector to the plane defined by the texture coordinate derivative vectors), is first determined by determining the cross product between dTdx' and dTdy' (step 308).

It is then checked whether the cross-product of the reduced precision texture coordinate derivative vectors is zero (step 309). If so, that means that the reduced precision texture coordinate derivative vectors are parallel. In that case the "Y" reduced precision texture coordinate derivative vector is set to zero (i.e. dTdy'=(0, 0, 0)) (step 310), and that zero length derivative vector is then replaced with a unit length axis-aligned derivative vector as discussed above (step 307). (The cross-product determination is then repeated accordingly).

When the cross-product of the reduced precision texture coordinate derivative vectors is not zero, a vector, orthovec, that is orthogonal to the normal vector defined by that cross-product, and the texture coordinate derivative vector that has been set as representing the x axis in the 2D coordinate system for the plane, dTdx', is then determined (step 311), i.e.

$$orthovec = Tdx' \times (dTdx' \times dTdy')$$

where dTdx' is the reduced precision representation of the texture coordinate derivative vector dTdx;

dTdy' is the reduced precision representation of the texture coordinate derivative vector dTdy; and orthovec is a vector representing the "y" axis direction in the 2D coordinate system for the plane defined by the texture coordinate derivative vectors (with the "x" axis corresponding to dTdx').

This then provides two vectors, dTdx' and orthovec, indicating the directions of the (x and y) coordinate axes in the 2D plane defined by the texture coordinate derivative vectors in a reduced precision 10-bit signed integer (in the present embodiments) format.

The coordinate axes in the 2D coordinate system for the plane defined by the texture coordinate derivative vectors aniso_x_axid, aniso_y_axis, are then determined as normalised (unit) vectors, i.e.:

$$aniso\_x\_axis = dTdx' / |dTdx'|$$

$$aniso\_y\_axis = orthovec / |orthovec|$$

(step 312).

Once the vectors, aniso_axis_x, aniso_axis_y, describing the directions of the x axis and the y axis of the 2D coordinate system for the plane defined by the texture coordinate derivative vectors have been determined in the above manner, those "axis" vectors are then used, together with representations of the texture coordinate derivative vectors, to determine projected texture coordinate derivative vectors, dTdx_proj, dTdy_proj, corresponding to the projection of the texture coordinate derivative vectors dTdx, dTdy in the 3D coordinate system of the 3D texture in the 2D coordinate system of the plane defined by the 3D texture coordinate derivative vectors (step 313):

$$dTdx\_proj = (dot(dTdx, aniso\_x\_axis), dot(dTdx, aniso\_y\_axis), 0)$$

$$dTdy\_proj = (dot(dTdy, aniso\_x\_axis), dot(dTdy, aniso\_y\_axis), 0).$$

where dTdx_proj, dTdy_proj are the respective projected texture coordinate derivative vectors in the 2D coordinate system of the plane defined by the texture coordinate derivative vectors;

aniso_x_axis and aniso_y_axis are the unit vectors defining the directions of the respective x and y axes in the 2D coordinate system of the plane defined by the texture coordinate derivative vectors; and dTdx and dTdy are the texture coordinate derivative vectors in the 3D coordinate system of the 3D texture in their full, e.g. FP32, precision that they are initially determined in.

In the present embodiments, the projected texture coordinate derivative vectors are determined in (using) the same floating-point precision as the original texture coordinate derivative vectors in the 3D coordinate system of the 3D texture (e.g. FP32 precision).

However, the Applicants have recognised that in practice when projecting the texture coordinate derivative vectors to the 2D coordinate system of the plane defined by the texture coordinate derivative vectors in this manner it is not necessary to use a floating-point representation for the texture coordinate derivative vectors at the same level of precision as the texture coordinate derivative vectors are initially defined in.

Thus, in another embodiment, when using the determined axis vectors together with the texture coordinate derivative vectors to determine a projection of the texture coordinate derivative vectors to the 2D coordinate system for the plane defined by the texture coordinate derivative vectors, a reduced precision floating-point representation of the texture coordinate derivative vectors is used.

In this case, where the texture coordinate derivative vectors dTdx, dTdy are initially defined in a FP32 format, the determination of the projected texture coordinate derivative vectors dTdx_proj, dTdy_proj in the 2D coordinate system of the plane defined by the texture coordinate derivative vectors in an embodiment uses a 26-bit floating-point format, with 1 sign-bit, 9 exponent bits and 16 mantissa bits, for the texture coordinate derivative vectors.

In order to determine the projected texture coordinate derivative vectors using the floating-point representations for the texture coordinate derivative vectors and the vectors representing the axes in 2D coordinate system of the plane defined by the 3D texture coordinate derivative vectors, the axis vectors, aniso_x_axis, aniso_y_axis, in the 2D coordinate system could, for example, first be converted back to a floating point representation, with the determinations then being done using that floating point representation of the "2D" axis vectors together with the floating point representation for the texture coordinate derivative vectors. The conversion of the "2D" axis vectors from an integer format to a floating-point format in this case can be performed in any suitable and desired manner.

Alternatively, the "2D" axis vectors could be left in their integer format and appropriately multiplied with the floating-point texture coordinate derivative vectors using an appropriate floating point and integer multiplication process (hardware).

Once the projected texture coordinate derivative vectors, dTdx_proj, dTdy_proj, in the 2D coordinate system of the plane defined by the texture coordinate derivative vectors have been determined, then those projected texture coordinate derivative vectors and the anisotropy axis vectors, aniso_axis_x, aniso_axis_y, are output to the anisotropic filtering parameter determination process, for use to determine the appropriate anisotropic filtering parameters for use in determining how to sample, and to control the sampling of, the 3D texture (step 314).

In the present embodiments, this is done using the projected texture coordinate derivative vectors in the normal manner for (and using the existing hardware/processes for) determining the anisotropic filtering parameters when anisotropically sampling a 2D texture in the graphics processor and graphics processing system in question (step 315).

Thus the projected texture coordinate derivative vectors in the 2D coordinate system for the 2D plane defined by the 3D texture coordinate derivative vectors are used to determine one or more parameters for an ellipse that is estimated and intended to correspond to the projection of the sampling position (pixel) for which the texture is being sampled onto the 2D plane defined by the 3D texture coordinate derivative vectors, which ellipse parameters are then used to determine the desired anisotropic filtering parameters to be used to control the anisotropic filtering process.

Figure 11:
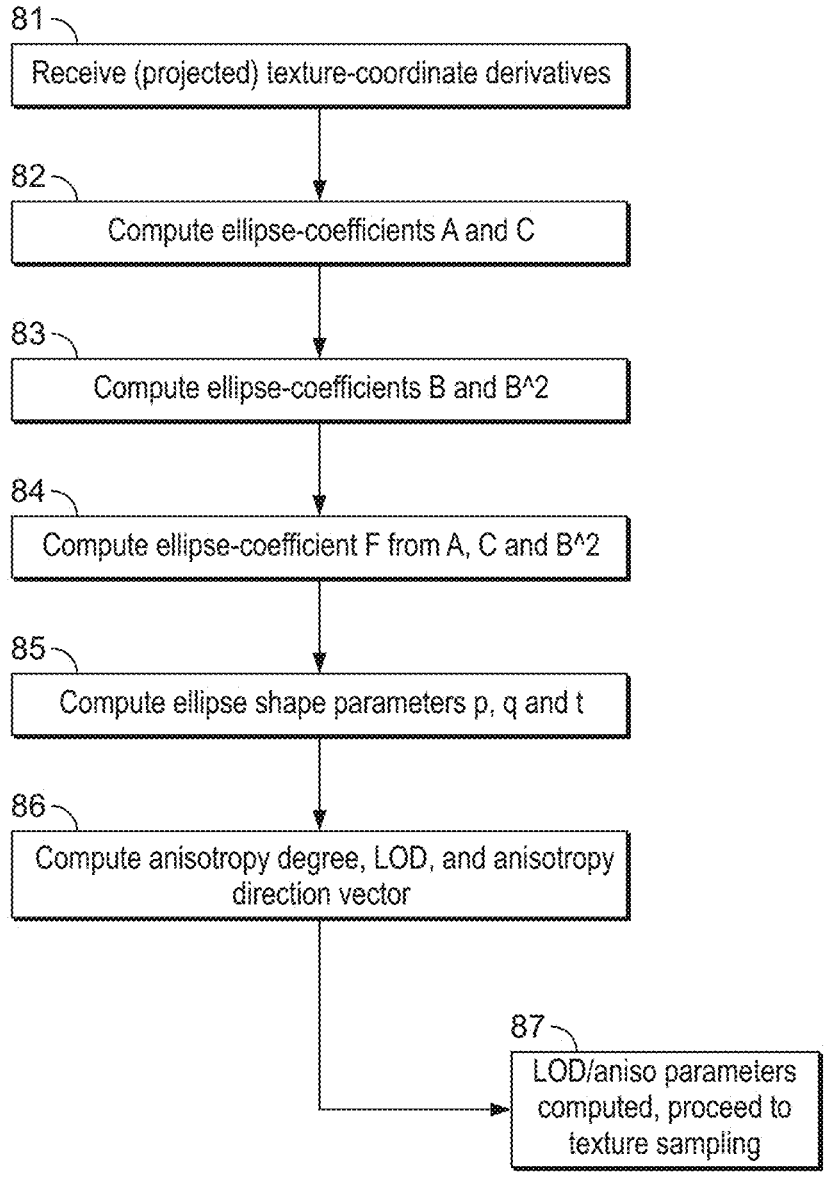
FIG. 11 is a flowchart showing embodiments of the process for anisotropic filtering of FIG. 9 in more detail.

FIG. 11 shows the process in the present embodiments that is performed by the texture mapper 110 to determine the anisotropic filtering parameters, namely the level of detail, the anisotropy degree and the anisotropy direction, using the projected texture coordinate derivative vectors dTdx_proj, dTdy_proj (essentially corresponding to the operation of the texture mapper in respect of step 315 in FIG. 10C).

The process in FIG. 11 starts when the projected texture coordinate derivative vectors are output to the anisotropic filtering parameter determining process (step 81).

There is then a sequence of steps 82-85 that determine (parameters of) an elliptical footprint corresponding to the projection of the position to be sampled.

In particular, the determined projected texture coordinate derivative vectors are first used to determine the coefficients A and C for the implicit function $Ax^2+Bxy+Cy^2=F$ defining the elliptical footprint of the sampling position (step 82).

In the present embodiment, the ellipse coefficients A and C are determined from the projected texture coordinate derivative vectors as follows:

$$A = \text{dTdx\_proj}.y\textasciicircum2 + \text{dTdy\_proj}.y\textasciicircum2$$

$$C = \text{dTdx\_proj}.x\textasciicircum2 + \text{dTdy\_proj}.x\textasciicircum2$$

The ellipse coefficient B (and its square, $B^2$) are then correspondingly determined (step 83). The ellipse coefficient B is determined from the projected texture coordinate derivative vectors as follows:

$$B = -2 * (\text{dTdx\_proj}.x * \text{dTdx\_proj}.y + \text{dTdy\_proj}.x * \text{dTdy\_proj}.y)$$

$B^2$ is then determined from the so-determined ellipse coefficient B.

The final ellipse coefficient F is then determined from the values of A, C and $B^2$ (step 84). In the present embodiments, this is done as follows:

$$F = A * C - (B\textasciicircum2)/4$$

The so-determined coefficients A, C, $B^2$ and F are then be used to determine appropriate ellipse shape parameters p, q and t (step 85), as follows:

$$p = A - C;$$

$$q = A + C;$$

-continued $$t = sqrt(p*p + B*B);$$

These steps accordingly determine the elliptical footprint of the projection of the sampling point onto the 2D plane defined by the texture coordinate derivative vectors.

The so-determined elliptical footprint (the parameters for the elliptical footprint) is then used to determine the anisotropy degree (the number of positions for which to sample the texture), the anisotropy direction (the direction of the vector along which samples should be taken in the texture), and the level of detail at which to sample texture (to thereby determine which mipmap(s) of the texture to sample) (step 86).

In the present embodiments, the anisotropy direction vector (which describes the direction of the major axis of the ellipse that is the projection of the sampling point onto the surface to which the texture is to be applied) is determined as x and y components, aniso_vec.x and aniso_vec.y, for a unit vector in the anisotropy direction, from the ellipse coefficients as follows:

```
if ( A > C )
{
aniso_vec.x = −B
aniso_vec.y = A − C + root
}
else
{
aniso_vec.x = A − C − root
aniso_vec.y = B
}
inv_len = 1.0 / sqrt( aniso_vec.x^2 + aniso_vec.y^2 )
aniso_vec.x = aniso_vec.x*inv_len
aniso_vec.y = aniso_vec.y*inv_len
where:
root = sqrt( (A − C)^2 + B^2 )
```

The anisotropy degree (aniso_degree), which gives the number of positions to be sampled, is determined in the present embodiments from the ellipse coefficients A, B and C, as follows:

$$root = sqrt((A − C)^{\wedge}2 + B^{\wedge}2)$$

$$aniso\_degree = sqrt((A + C + root)/(A + C − root))$$

In the present embodiments, the level of detail is determined as follows:

$$lod = 0.5 * (log2(2F) − log2(A + C + root))$$

Other arrangements for determining the anisotropic filtering parameters, ellipse coefficients, etc., would, of course, be possible.

Once the level of detail, anisotropy degree and anisotropy direction vector have been determined, then the texture sampling can proceed (step 87).

As shown in FIG. 10C, once the level of detail, anisotropy degree and anisotropy direction vector have been determined at step 315, it is then checked whether anisotropic filtering of a 3D texture is being performed (step 316). If not, then the determined level of detail, anisotropy degree and anisotropy direction vector are output to the texture sampling process for use to sample the (2D) texture in the normal manner (step 318).

On the other hand, in the case where anisotropic filtering of a 3D texture is being performed, then the determined anisotropy direction vector (aniso_vec.x, aniso_vec.y) in the 2D plane defined by the texture coordinate derivative vectors is first transformed back to the 3D coordinate system of the 3D texture, to provide a corresponding anisotropy direction vector, aniso_vec_3D, in the 3D coordinate system of the 3D texture:

$$aniso\_vec\_3D = aniso\_vec\_x * aniso\_axis\_x + aniso\_vec.y * aniso\_axis\_y$$

where aniso_vec.x and aniso_vec.y are the respective X and Y components of the anisotropy direction vector determined in the 2D coordinate system of the plane defined by the texture coordinate derivative vectors; and aniso_axis_x, aniso_axis_y are the determined axis direction vectors for the 2D coordinate system for that plane.

Once the transformed anisotropy direction vector in the 3D coordinate system of the 3D texture has been determined, then that vector, together with the determined level of detail and anisotropy degree are provided to the texture sampling process for the texture to then be sampled based on those parameters (step 318).

The sampling of the texture itself can be performed in any suitable and desired manner based on the determined anisotropic filtering parameters, and should be done appropriately and in accordance with the graphics processor and graphics processing system in question.

Figure 12:
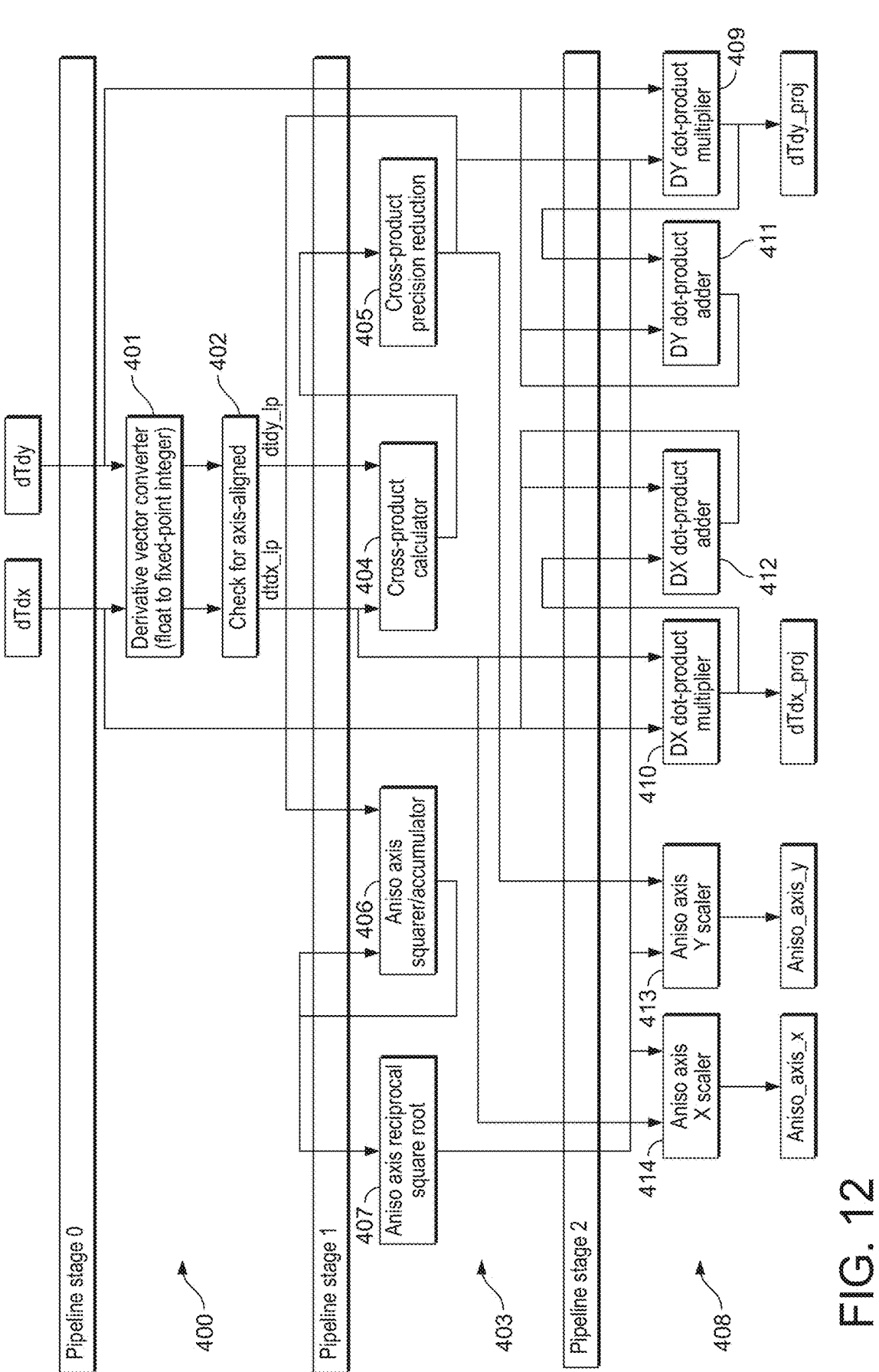
FIG. 12 shows a multi-cycle pipeline for performing anisotropic filtering in an embodiment of the technology described herein.

FIG. 12 shows an embodiment of a 3-stage, multi-cycle pipeline that can be used to determine the projected texture coordinate derivative vectors and the axis direction vectors in the 2D coordinate system for the plane defined by the texture coordinate derivative vectors in the above embodiments.

As shown in FIG. 12, the first stage 400 of the pipeline is a single cycle stage that converts 401 the floating-point 3D texture coordinate input derivative vectors to an appropriate reduced precision integer representation of those vectors (e.g. from vec3 f9q16_t_precision to vec3 s10_t precision).

It is assumed in this regard that the input texture coordinate derivative vectors have already been converted from fp32 format to f9q16_t format after the derivatives are computed from the texture-coordinates. (The 9-bit exponent is used so that denormal values in fp32 become normalized values in f9q16_t. The 9-bit exponent also ensures that there shouldn't be a floating-point overflow (to infinity) in the subsequent calculations. The mantissa is reduced from 23-bits to 16-bits simply by discarding the 7 LSB's.)

This first pipeline stage 400 then converts the f9q16_t texture coordinate derivative vectors to a reduced precision integer format.

It is then determined 402 if the resulting low precision derivative vectors are both in the same axis aligned plane (as discussed above).

As shown in FIG. 12, the second stage 403 of the pipeline comprises an 8-cycle stage containing: a cross product unit 404, a bit renormalisation unit 405; a squarer-accumulator unit 406 (that determines r=a+b*b); and a reciprocal square root unit 407 to determine 1.0/sqrt (a).

The cross-product unit 404 performs the cross-product operations necessary for determining orthovec (as discussed above). Thus it is configured to generate a cross-product of two vectors of the form vec3 s10_t. As in the present embodiments the reduced precision representations of the texture coordinate derivative vectors are in the form of signed integer vectors, the determination of orthovec (two cross-products) will comprise a series of:

$$r = a * b - c * d$$

operations, which are, in the present embodiments, implemented in hardware as a Carry-Save Adder (CSA) tree.

As the result of one cross-product determination operation will be in the form vec3 s20_t (because of the multiplication), the bit renormalisation unit 405 is then used to and operates to convert the vec3 s20_t output of the cross-product unit back to vec3 s10_t format (i.e. to appropriately reduce the precision of the output of the cross-product unit). This is done by left shifting all the components of the resulting vector by 10-bits (or as much as possible whilst not overflowing the 20-bits available), with the lower 10-bits of each component then being discarded to provide a 10-bit vector. This is done for each cross-product operation.

The squarer-accumulator 406 then operates to determine the squared length of the relevant vectors (using s10_t precision) (for use to determine the unit vectors representing the axes of the 2D coordinate system in the plane defined by the texture coordinate derivative vectors). This determination corresponds to:

$$r = x * x + y * y + z * z,$$

and so can be implemented as a sequence of r=a+b*b operations, which, where the values are N-bit integers, can be implemented in hardware as a CSA tree.

The reciprocal square root unit 407 of the second stage of the pipeline then determines the reciprocal of the squared length of the vectors to provide an appropriate scaling factor for use to normalise the axis vectors:

$$\text{scale} = 1.0 / sqrt(x * x + y * y + z * z).$$

This determination (of y=1.0/sqrt(x)) is done, in the present embodiments, using a piecewise-linear approximation that uses a small lookup table with a subsequent multiply-add computation.

The final pipeline stage 408 in this embodiment is then an 8-cycle stage containing the following functional units: a floating-point multiplier (two instances 409, 410); a floating-point adder (two instances 411, 412); and a scaler unit (two instances 413, 414).

The floating point multiplier units 409, 410 operate to multiply a floating point value from the floating point representations of the texture coordinate derivative vectors by an integer value from the axis vectors:

$$f9q16\_t = f9q16\_t * s1q12\_t.$$

The floating point adder units 411, 412 operate to add together two outputs from the floating point multiplier units:

$$f9q16\_t = f9q16\_t + f9q16\_t.$$

The floating point multiplier and floating point adder units are used to determine the projected texture coordinate derivative vectors in the 2D coordinate system of the plane defined by the texture coordinate derivative vectors.

The scaler circuits 413, 414 use the scale factors determined in the second stage of the pipeline to normalise the axis vectors in the 2D plane defined by the texture coordinate derivative vectors, to provide the required unit vectors, aniso_x_axis, aniso_y_axis, indicating the direction of the (x and y) coordinate axes in the 2D plane defined by the texture coordinate derivative vectors.

In this embodiment, after 8 cycles of processing in this pipeline, the projected texture coordinate derivatives in the 2D plane defined by the texture coordinate derivatives, dTdx_proj, dTdy_proj, and the vectors indicating the axis direction of the axes in the 2D coordinate system for the plane (i.e. indicating the mapping of the 2D coordinate system back to the 3D coordinate system of the 3D texture), aniso_axis_x, aniso_axis_y, will have been generated.

FIG. 13 is a corresponding pipeline timing diagram for the operation of the pipeline of FIG. 12.

Other arrangements are, of course, possible.

It will be appreciated from the above that the technology described herein, in its embodiments at least, can provide improved techniques for anisotropic filtering of 3D textures that can, for example, reduce the processing burden when performing anisotropic filtering of a 3D texture.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

The invention claimed is:

1. A method of performing anisotropic filtering when sampling a 3D texture to provide an output sampled texture value for use when rendering an output in a graphics processing system, the method comprising:

when sampling a 3D texture using anisotropic filtering to provide an output sampled texture value for a position X, Y in a render output:
determining an anisotropy direction along which to take samples in the texture by:
determining a pair of texture coordinate derivative vectors, dTdx, dTdy, in the coordinate system of the 3D texture for the position in the render output for which the texture is to be sampled;
determining a reduced precision representation dTdx', dTdy' of each determined texture coordinate derivative vector dTdx, dTdy;
using the reduced precision representations dTdx', dTdy' of the texture coordinate derivative vectors to determine a pair of vectors, aniso_axis_x, aniso_axis_y, representing the directions of x and y axes, respectively, for a 2D coordinate system on the plane in the 3D texture defined by the texture coordinate derivative vectors dTdx, dTdy;

using the determined x and y axis vectors, aniso_axis_x, aniso_axis_y, for the 2D coordinate system on the plane in the 3D texture defined by the texture coordinate derivative vectors dTdx, dTdy, together with representations of the texture coordinate derivative vectors, to determine projected representations dTdx_proj, dTdy_proj, of the texture coordinate derivative vectors dTdx, dTdy, in the 2D coordinate system on the plane in the 3D texture defined by the texture coordinate derivative vectors dTdx, dTdy, wherein:

the determining the projected representations dTdx_proj, dTdy_proj, of the texture coordinate derivative vectors dTdx, dTdy, in the 2D coordinate system on the plane in the 3D texture defined by the texture coordinate derivative vectors dTdx, dTdy comprises determining both an X-axis component and a Y-axis component in the 2D coordinate system on the plane in the 3D texture for each projected representation, dTdx_proj, dTdy_proj, of the texture coordinate derivative vectors;

the method further comprising:

using the determined projected representations, dTdx_proj, dTdy_proj, of the 3D texture coordinate derivative vectors dTdx, dTdy, in the 2D coordinate system on the plane to determine an anisotropy direction along which to take samples in the texture;

transforming the so-determined anisotropy direction back to the coordinate system of the 3D texture to thereby determine an anisotropy direction in the 3D texture along which to take samples in the texture;

taking one or more samples along the determined anisotropy direction in the 3D texture; and using the sample or samples taken along the anisotropy direction in the 3D texture to provide an output sampled texture value for use for the position in the render output for which the texture is being sampled.

2. The method of claim 1, wherein the reduced precision representations, dTdx', dTdy', of the texture coordinate derivative vectors in the 3D coordinate system of the 3D texture comprise integer representations of the 3D texture coordinate derivative vectors.

3. The method of claim 1, wherein the initial texture coordinate derivative vectors are provided in a floating point format, and are converted into a reduced precision integer format by:

scaling the floating point component values for a texture coordinate derivative vector to a common exponent, and then using the upper N bits of each of the mantissas of the floating point component values when scaled in this fashion for the integer representations of the components of the reduced precision representation of the texture coordinate derivative vector.

4. The method of claim 1, comprising:

using the reduced precision representations dTdx', dTdy' of the texture coordinate derivative vectors to determine a pair of vectors, aniso_axis_x, aniso_axis_y, representing the directions of x and y axes, respectively, for a 2D coordinate system on the plane in the 3D texture defined by the texture coordinate derivative vectors dTdx, dTdy by:

setting one of the coordinate axes for the 2D coordinate system in the plane defined by the texture coordinate derivative vectors to be parallel to one of the reduced precision representations of the texture coordinate derivative vectors; and setting the other axis vector for the 2D coordinate system for the plane defined by the texture coordinate derivative vectors as a vector in that plane that is perpendicular to that axis.

5. The method of claim 1, wherein using the determined x and y axis vectors, aniso_axis_x, aniso_axis_y, for the 2D coordinate system on the plane in the 3D texture defined by the texture coordinate derivative vectors dTdx, dTdy, together with representations of the texture coordinate derivative vectors, to determine projected representations dTdx_proj, dTdy_proj, of the texture coordinate derivative vectors dTdx, dTdy, in the 2D coordinate system on the plane in the 3D texture defined by the texture coordinate derivative vectors dTdx, dTdy, comprises, for a respective texture coordinate derivative vector:

determining the dot product of a representation of the texture coordinate derivative vector in the 3D coordinate system of the 3D texture with normalised determined x and y axis vectors, aniso_axis_x, aniso_axis_y, for the 2D coordinate system on the plane in the 3D texture defined by the texture coordinate derivative vectors.

6. The method of claim 1, wherein using the determined x and y axis vectors, aniso_axis_x, aniso_axis_y, for the 2D coordinate system on the plane in the 3D texture defined by the texture coordinate derivative vectors dTdx, dTdy, together with representations of the texture coordinate derivative vectors, to determine projected representations dTdx_proj, dTdy_proj, of the texture coordinate derivative vectors dTdx, dTdy, in the 2D coordinate system on the plane in the 3D texture defined by the texture coordinate derivative vectors dTdx, dTdy, comprises:

determining the projected representations dTdx_proj, dTdy_proj, of the texture coordinate derivative vectors dTdx, dTdy, in the 2D coordinate system on the plane in the 3D texture defined by the texture coordinate derivative vectors dTdx, dTdy using reduced precision floating point representations of the texture coordinate derivative vectors.

7. The method of claim 1, comprising:

determining whether the reduced precision representations of the texture coordinate derivative vectors have a particular property or properties; and when it is determined that the reduced precision representations of the texture coordinate derivative vectors other than have the particular property or properties:

using the reduced precision representations dTdx', dTdy' of the texture coordinate derivative vectors to determine a pair of vectors, aniso_axis_x, aniso_axis_y, representing the directions of x and y axes, respectively, for a 2D coordinate system on the plane in the 3D texture defined by the texture coordinate derivative vectors dTdx, dTdy; and using the determined x and y axis vectors, aniso_axis_x, aniso_axis_y, for the 2D coordinate system on the plane in the 3D texture defined by the texture coordinate derivative vectors dTdx, dTdy, together with representations of the texture coordinate derivative vectors, to determine projected representations dTdx_proj, dTdy_proj, of the texture coordinate derivative vectors dTdx, dTdy, in the 2D coordinate system on the plane in the 3D texture defined by the texture coordinate derivative vectors dTdx, dTdy.

8. The method of claim 1, comprising:

determining whether the 3D texture coordinate derivative vectors both have a same component that is zero for both texture coordinate derivative vectors; and when it is determined that the texture coordinate derivative vectors both have a same component that is zero, determining projected representations, dTdx_proj, dTdy_proj, of the texture coordinate derivative vectors dTdx, dTdy, in a 2D coordinate system on the plane in the 3D texture defined by the texture coordinate derivative vectors dTdx, dTdy by:

using the other components of the texture coordinate derivative vectors directly as the components for the projected texture coordinate derivative vectors.

9. The method of claim 1, comprising:

using the determined projected texture coordinate derivative vectors to determine an anisotropy direction along which to take samples in the texture, an anisotropy degree indicative of a number of positions to be sampled in the texture when performing the anisotropic filtering, and a level of detail (LOD) at which to sample the texture.

10. A method of performing anisotropic filtering when sampling a 3D texture to provide an output sampled texture value for use when rendering an output in a graphics processing system, the method comprising:

when determining an anisotropy direction along which to take samples in a 3D texture when sampling a 3D texture using anisotropic filtering to provide an output sampled texture value for a position X, Y in a render output using a pair of texture coordinate derivative vectors, dTdx, dTdy, in the coordinate system of the 3D texture for the position in the render output for which the texture is to be sampled:

determining whether the 3D texture coordinate derivative vectors both have a same component that is zero for both texture coordinate derivative vectors; and when it is determined that the texture coordinate derivative vectors both have a same component that is zero, determining projected representations, dTdx_proj, dTdy_proj, of the texture coordinate derivative vectors dTdx, dTdy, in a 2D coordinate system on the plane in the 3D texture defined by the texture coordinate derivative vectors dTdx, dTdy by:

using the other components of the texture coordinate derivative vectors directly as the components for the projected texture coordinate derivative vectors;

the method further comprising:

using the determined projected representations, dTdx_proj, dTdy_proj, of the 3D texture coordinate derivative vectors dTdx, dTdy, in the 2D coordinate system on the plane to determine an anisotropy direction along which to take samples in the texture;

transforming the so-determined anisotropy direction back to the coordinate system of the 3D texture to thereby determine an anisotropy direction in the 3D texture along which to take samples in the texture;

taking one or more samples along the determined anisotropy direction in the 3D texture; and using the sample or samples taken along the anisotropy direction in the 3D texture to provide an output sampled texture value for use for the position in the render output for which the texture is being sampled.

11. The method of claim 10, wherein determining whether the 3D texture coordinate derivative vectors both have a same component that is zero for both texture coordinate derivative vectors comprises:

determining whether reduced precision representations of the 3D texture coordinate derivative vectors have a same component that is zero for both reduced precision representations of the texture coordinate derivative vectors.

12. An apparatus for performing anisotropic filtering when sampling a 3D texture to provide an output sampled texture value for use when rendering an output in a graphics processing system, the apparatus comprising:

an anisotropy direction determining circuit configured to, when sampling a 3D texture using anisotropic filtering to provide an output sampled texture value for a position X, Y in a render output, determine an anisotropy direction along which to take samples in a texture by:

determining a pair of texture coordinate derivative vectors, dTdx, dTdy, in the coordinate system of the 3D texture for the position in the render output for which the texture is to be sampled;

determining a reduced precision representation dTdx', dTdy' of each determined texture coordinate derivative vector dTdx, dTdy;

using the reduced precision representations dTdx', dTdy' of the texture coordinate derivative vectors to determine a pair of vectors, aniso_axis_x, aniso_axis_y, representing the directions of x and y axes, respectively, for a 2D coordinate system on the plane in the 3D texture defined by the texture coordinate derivative vectors dTdx, dTdy;

using the determined x and y axis vectors, aniso_axis_x, aniso_axis_y, for the 2D coordinate system on the plane in the 3D texture defined by the texture coordinate derivative vectors dTdx, dTdy, together with representations of the texture coordinate derivative vectors, to determine projected representations dTdx_proj, dTdy_proj, of the texture coordinate derivative vectors dTdx, dTdy, in the 2D coordinate system on the plane in the 3D texture defined by the texture coordinate derivative vectors dTdx, dTdy, wherein:

the determining the projected representations dTdx_proj, dTdy_proj, of the texture coordinate derivative vectors dTdx, dTdy, in the 2D coordinate system on the plane in the 3D texture defined by the texture coordinate derivative vectors dTdx, dTdy comprises determining both an X-axis component and a Y-axis component in the 2D coordinate system on the plane in the 3D texture for each projected representation, dTdx_proj, dTdy_proj, of the texture coordinate derivative vectors;

using the determined projected representations, dTdx_proj, dTdy_proj, of the 3D texture coordinate derivative vectors dTdx, dTdy, in the 2D coordinate system on the plane to determine an anisotropy direction along which to take samples in the texture; and transforming the so-determined anisotropy direction back to the coordinate system of the 3D texture to thereby determine an anisotropy direction in the 3D texture along which to take samples in the texture;

the apparatus further comprising:

a texture sampling circuit configured to take one or more samples along a determined anisotropy direction in a 3D texture; and a sample combining circuit configured to use a sample or samples taken along an anisotropy direction in a 3D texture to provide an output sampled texture value for use for a position in a render output for which the texture is being sampled.

13. The apparatus of claim 12, wherein the reduced precision representations, dTdx', dTdy', of the texture coordinate derivative vectors in the 3D coordinate system of the 3D texture comprise integer representations of the 3D texture coordinate derivative vectors.

14. The apparatus of claim 12, wherein the anisotropy direction determining circuit is configured to determine a reduced precision representation dTdx', dTdy' of each determined texture coordinate derivative vector dTdx, dTdy by:

converting texture coordinate derivative vectors provided in a floating point format into a reduced precision integer format by:

scaling the floating point component values for a texture coordinate derivative vector to a common exponent, and then using the upper N bits of each of the mantissas of the floating point component values when scaled in this fashion for the integer representations of the components of the reduced precision representation of the texture coordinate derivative vector.

15. The apparatus of claim 12, wherein the anisotropy direction determining circuit is configured to use the reduced precision representations dTdx', dTdy' of the texture coordinate derivative vectors to determine a pair of vectors, aniso_axis_x, aniso_axis_y, representing the directions of x and y axes, respectively, for a 2D coordinate system on the plane in the 3D texture defined by the texture coordinate derivative vectors dTdx, dTdy by:

setting one of the coordinate axes for the 2D coordinate system in the plane defined by the texture coordinate derivative vectors to be parallel to one of the reduced precision representations of the texture coordinate derivative vectors; and setting the other axis vector for the 2D coordinate system for the plane defined by the texture coordinate derivative vectors as a vector in that plane that is perpendicular to that axis.

16. The apparatus of claim 12, wherein the anisotropy direction determining circuit is configured to use the determined x and y axis vectors, aniso_axis_x, aniso_axis_y, for the 2D coordinate system on the plane in the 3D texture defined by the texture coordinate derivative vectors dTdx, dTdy, together with representations of the texture coordinate derivative vectors, to determine projected representations dTdx_proj, dTdy_proj, of the texture coordinate derivative vectors dTdx, dTdy, in the 2D coordinate system on the plane in the 3D texture defined by the texture coordinate derivative vectors dTdx, dTdy by, for a respective texture coordinate derivative vector:

determining the dot product of a representation of the texture coordinate derivative vector in the 3D coordinate system of the 3D texture with normalised determined x and y axis vectors, aniso_axis_x, aniso_axis_y, for the 2D coordinate system on the plane in the 3D texture defined by the texture coordinate derivative vectors.

17. The apparatus of claim 12, wherein the anisotropy direction determining circuit is configured to use the determined x and y axis vectors, aniso_axis_x, aniso_axis_y, for the 2D coordinate system on the plane in the 3D texture defined by the texture coordinate derivative vectors dTdx, dTdy, together with representations of the texture coordinate derivative vectors, to determine projected representations dTdx_proj, dTdy_proj, of the texture coordinate derivative vectors dTdx, dTdy, in the 2D coordinate system on the plane in the 3D texture defined by the texture coordinate derivative vectors dTdx, dTdy, by:

determining the projected representations dTdx_proj, dTdy_proj, of the texture coordinate derivative vectors dTdx, dTdy, in the 2D coordinate system on the plane in the 3D texture defined by the texture coordinate derivative vectors dTdx, dTdy using reduced precision floating point representations of the texture coordinate derivative vectors.

18. The apparatus of claim 12, wherein the anisotropy direction determining circuit is configured to:

determine whether the reduced precision representations of the texture coordinate derivative vectors have a particular property or properties; and when it is determined that the reduced precision representations of the texture coordinate derivative vectors other than have the particular property or properties:

use the reduced precision representations dTdx', dTdy' of the texture coordinate derivative vectors to determine a pair of vectors, aniso_axis_x, aniso_axis_y, representing the directions of x and y axes, respectively, for a 2D coordinate system on the plane in the 3D texture defined by the texture coordinate derivative vectors dTdx, dTdy; and use the determined x and y axis vectors, aniso_axis_x, aniso_axis_y, for the 2D coordinate system on the plane in the 3D texture defined by the texture coordinate derivative vectors dTdx, dTdy, together with representations of the texture coordinate derivative vectors, to determine projected representations dTdx_proj, dTdy_proj, of the texture coordinate derivative vectors dTdx, dTdy, in the 2D coordinate system on the plane in the 3D texture defined by the texture coordinate derivative vectors dTdx, dTdy.

19. The apparatus of claim 12, wherein the anisotropy direction determining circuit is configured to:

determine whether the 3D texture coordinate derivative vectors both have a same component that is zero for both texture coordinate derivative vectors; and when it is determined that the texture coordinate derivative vectors both have a same component that is zero, determine projected representations, dTdx_proj, dTdy_proj, of the texture coordinate derivative vectors dTdx, dTdy, in a 2D coordinate system on the plane in the 3D texture defined by the texture coordinate derivative vectors dTdx, dTdy by:

using the other components of the texture coordinate derivative vectors directly as the components for the projected texture coordinate derivative vectors.

20. The apparatus of claim 19, wherein the anisotropy direction determining circuit is configured to determine whether the 3D texture coordinate derivative vectors both have a same component that is zero for both texture coordinate derivative vectors by:

determining whether reduced precision representations of the 3D texture coordinate derivative vectors have a same component that is zero for both reduced precision representations of the texture coordinate derivative vectors.

21. A non-transitory computer readable storage medium storing computer software code which when executing on one or more processors performs a method of performing anisotropic filtering when sampling a 3D texture to provide an output sampled texture value for use when rendering an output in a graphics processing system, the method comprising:

when sampling a 3D texture using anisotropic filtering to provide an output sampled texture value for a position X, Y in a render output:

determining an anisotropy direction along which to take samples in the texture by:

determining a pair of texture coordinate derivative vectors, dTdx, dTdy, in the coordinate system of the 3D texture for the position in the render output for which the texture is to be sampled;

determining a reduced precision representation dTdx', dTdy' of each determined texture coordinate derivative vector dTdx, dTdy;

using the reduced precision representations dTdx', dTdy' of the texture coordinate derivative vectors to determine a pair of vectors, aniso_axis_x, aniso_axis_y, representing the directions of x and y axes, respectively, for a 2D coordinate system on the plane in the 3D texture defined by the texture coordinate derivative vectors dTdx, dTdy;

using the determined x and y axis vectors, aniso_axis_x, aniso_axis_y, for the 2D coordinate system on the plane in the 3D texture defined by the texture coordinate derivative vectors dTdx, dTdy, together with representations of the texture coordinate derivative vectors, to determine projected representations dTdx_proj, dTdy_proj, of the texture coordinate derivative vectors dTdx, dTdy, in the 2D coordinate system on the plane in the 3D texture defined by the texture coordinate derivative vectors dTdx, dTdy, wherein:

the determining the projected representations dTdx_proj, dTdy_proj, of the texture coordinate derivative vectors dTdx, dTdy, in the 2D coordinate system on the plane in the 3D texture defined by the texture coordinate derivative vectors dTdx, dTdy comprises determining both an X-axis component and a Y-axis component in the 2D coordinate system on the plane in the 3D texture for each projected representation, dTdx_proj, dTdy_proj, of the texture coordinate derivative vectors;

the method further comprising:

using the determined projected representations, dTdx_proj, dTdy_proj, of the 3D texture coordinate derivative vectors dTdx, dTdy, in the 2D coordinate system on the plane to determine an anisotropy direction along which to take samples in the texture;

transforming the so-determined anisotropy direction back to the coordinate system of the 3D texture to thereby determine an anisotropy direction in the 3D texture along which to take samples in the texture;

taking one or more samples along the determined anisotropy direction in the 3D texture; and using the sample or samples taken along the anisotropy direction in the 3D texture to provide an output sampled texture value for use for the position in the render output for which the texture is being sampled.

* * * * *